(12) United States Patent
Fujita et al.

(10) Patent No.: US 9,188,742 B2
(45) Date of Patent: Nov. 17, 2015

(54) TERAHERZ-WAVE CONNECTOR AND TERAHERZ-WAVE INTEGRATED CIRCUITS, AND WAVE GUIDE AND ANTENNA STRUCTURE

(71) Applicants: ROHM CO., LTD., Kyoto (JP); OSAKA UNIVERSITY, Osaka (JP)

(72) Inventors: Masayuki Fujita, Osaka (JP); Tadao Nagatsuma, Osaka (JP); Tsukasa Ishigaki, Osaka (JP); Dai Onishi, Kyoto (JP); Eiji Miyai, Kyoto (JP)

(73) Assignees: ROHM CO., LTD., Kyoto (JP); OSAKA UNIVERSITY, Osaka (JP)

( * ) Notice: Subject to any disclaimer, the term of this patent is extended or adjusted under 35 U.S.C. 154(b) by 0 days.

(21) Appl. No.: 14/196,528

(22) Filed: Mar. 4, 2014

(65) Prior Publication Data
US 2014/0248020 A1 Sep. 4, 2014

(30) Foreign Application Priority Data

Mar. 4, 2013 (JP) ................................. 2013-041606
Feb. 18, 2014 (JP) ................................. 2014-028756

(51) Int. Cl.
G02B 6/26 (2006.01)
G02B 6/122 (2006.01)

(52) U.S. Cl.
CPC .................................. *G02B 6/1225* (2013.01)

(58) Field of Classification Search
USPC ........................................ 385/24, 28, 39, 43
See application file for complete search history.

(56) References Cited

U.S. PATENT DOCUMENTS

2006/0285797 A1* 12/2006 Little ............................... 385/43
2009/0092156 A1* 4/2009 Wong et al. ........................ 372/3
2014/0219602 A1* 8/2014 Chen et al. ....................... 385/12

OTHER PUBLICATIONS

Tsukasa Ishigaki, Masayuki Fujita and Tadao Nagatsuma,"Investigation of a Photonic-Crystal Slab for Terahertz-Wave Integrated Circuits", Institute of Electronics, Information and Communication Engineers General Conference 2012.
Tsukasa Ishigaki, Masayuki Fujita, Masaya Nagai, Masaaki Ashida and Tadao Nagatsuma, "Photonic-Crystal Slab for Terahertz-Wave Integrated Circuits", IEEE Photonics Conference 2012 (IPC2012), Burlingame, No. ThJ3, Sep. 27, pp. 774-775, 2012.
Tadao Nagatsuma, Masayuki Fujita, Toshikazu Mukai, Kazuisao Tsuruda and Dai Onishi, "Recent Progress and Future Prospects of Terahertz Communications Using Resonant Tunneling Diodes", National Institute of Information and Communications Technology (NICT) Symposium-Possible Application of Terahertz Wave Technology in Industry, Tokyo, Jan. 16, 2013.
(Continued)

*Primary Examiner* — Eric Wong
(74) *Attorney, Agent, or Firm* — Rabin & Berdo, P.C.

(57) ABSTRACT

The terahertz-wave connector includes: a 2D-PC slab; lattice points periodically arranged in the 2D-PC slab, the lattice points for diffracting the THz waves in PBG frequencies of photonic band structure of the 2D-PC slab in order to prohibit existence in a plane of the 2D-PC slab; a 2D-PC waveguide disposed in the 2D-PC slab and formed with a line defect of the lattice points; and an adiabatic mode converter disposed at the edge face of the 2D-PC slab to which the 2D-PC waveguide extended, the 2D-PC waveguide extended to the adiabatic mode converter. There is provided also the THz-wave IC to which such a terahertz-wave connector is applied.

27 Claims, 27 Drawing Sheets

(56) References Cited

OTHER PUBLICATIONS

L. B. Lok, S. Singh, A. Wilson and K. Elgaid, "Impact of waveguide aperture dimensions and misalignment on the calibrated performance of a network analyzer from 140 to 325GHz", Microwave Measurement Conference, 2009 73rd ARFTG, Digital Object Identifier: 10.1109/ARFTG.2009.5278062.

M. Schuster, O. Antoniuk, P. Lahl, and N. Klein, "Resonant and waveguiding defect modes in a two-dimensional electromagnetic band-gap slab structure for millimeter wave frequencies", J. Appl. Phys. 97, 044912 (2005).

Hitomichi Takano, Yoshihiro Akahane, Takashi Asano and Susumu Noda, "In-plane-type channel drop filter in a two-dimensional photonic crystal slab", Appl. Phys. Lett. 84, 2226 (2004).

* cited by examiner

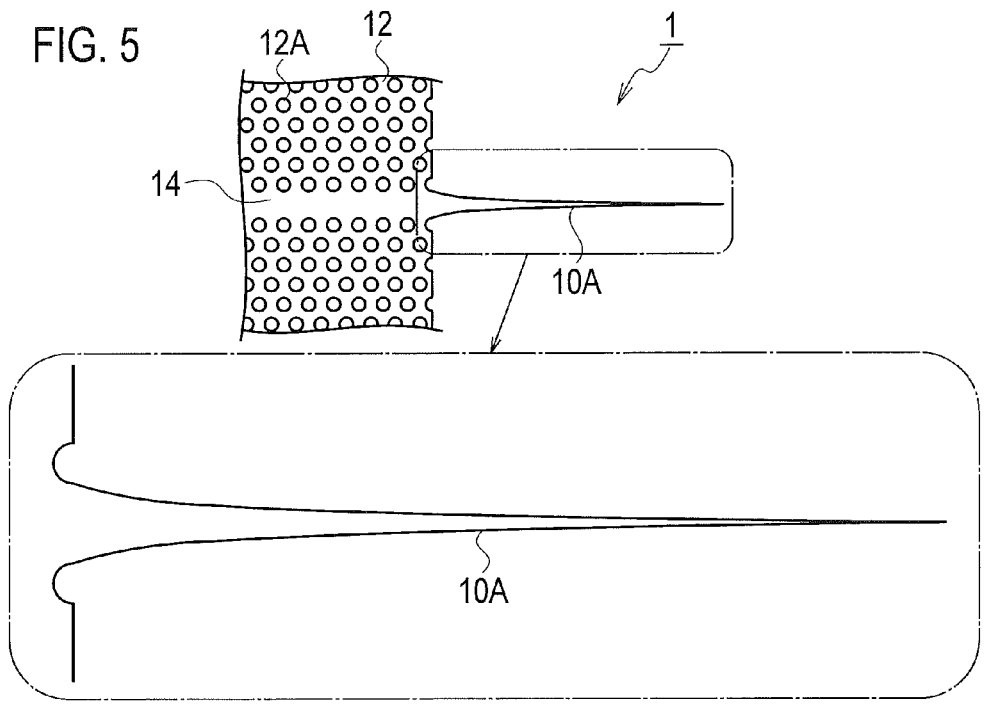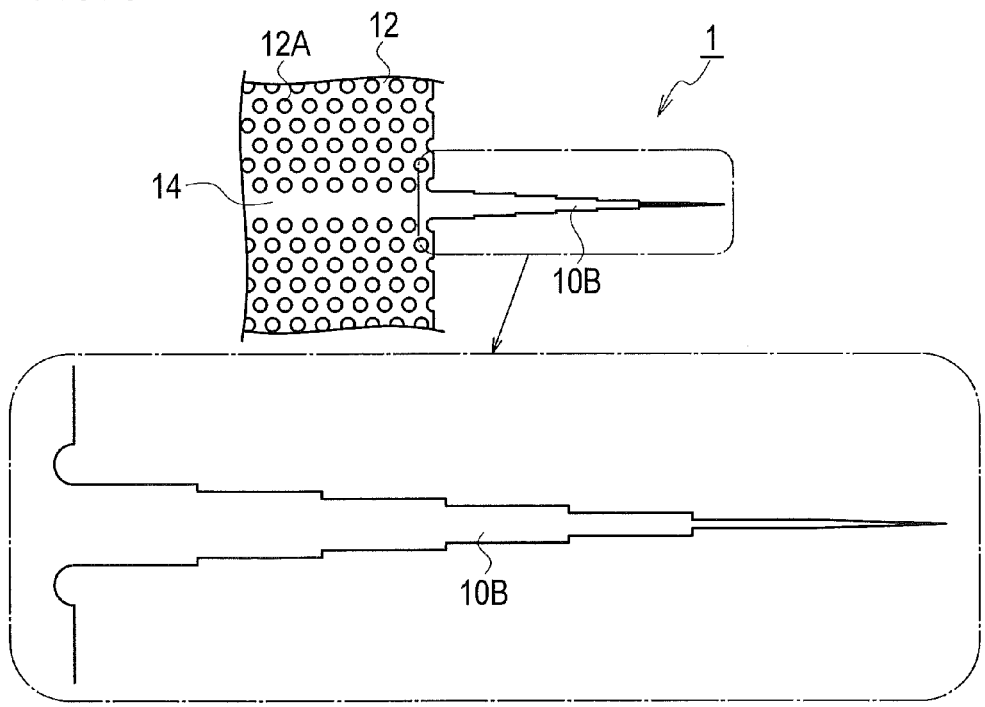

TERAHERZ-WAVE CONNECTOR AND TERAHERZ-WAVE INTEGRATED CIRCUITS, AND WAVE GUIDE AND ANTENNA STRUCTURE

CROSS REFERENCE TO RELATED APPLICATIONS AND INCORPORATION BY REFERENCE

This application is based upon and claims the benefit of priority from prior Japanese Patent Application Nos. P2013-41606 filed on Mar. 4, 2013, and P2014-28756 filed on Feb. 18, 2014, the entire contents of which are incorporated herein by reference.

TECHNICAL FIELD

The present invention relates to a terahertz (THz)-wave connector and a THz-wave integrated circuit (IC), and a waveguide and antenna structure. In particular, the present invention relates to: a THz-wave connector and THz-wave IC each which can reduce a connection loss in an interface between two dimensional photonic crystal (2D-PC) slab and the waveguide; and a waveguide having nonreflective structure for controlling an influence of light interference and multiple reflection in a waveguide end, and an antenna structure to which such a waveguide are applied.

BACKGROUND ART

In recent years, for THz wave band (0.1 THz to 10 THz) positioned in intermediate frequencies between electromagnetic waves and light waves, studies of applicabilities of ultra high-speed wireless communications, sensing, imaging, etc. have become active, and there has been expected its practical application. However, since THz-wave systems are composed of large-sized and three-dimensional structured components under the current circumstances, large-sized and expensive configurations are required for such THz-wave systems. In order to miniaturize the whole of such systems, implementation of THz-wave ICs integrating devices is indispensable.

Utilization of technologies of both of a light wave region and an electric wave region can be considered as fundamental technologies of the THz-wave ICs. However, optical components, e.g. lenses, mirrors, are composed of large-sized and three-dimensional structured components, and therefore are not suitable for the integration. Moreover, it is becoming difficult to produce hollow metal waveguides used in the electric wave region due to its fine three-dimensional structure. A waveguide loss in planar metallic-transmission lines is increased as effect of metallic absorption is increased.

As a fundamental technology of THz-wave ICs, there has been studied applicability of a 2D-PC slab where outstanding progress is seen in the light wave region (e.g., refer to Non Patent Literatures 1-3.).

The waveguide for the THz wave band is standardized in a range from WR6 (110 GHz to 170 GHz) to WR1 (0.75 THz to 1.1 THz). Although the cross-sectional size is as small as in a range from 1651 μm×826 μm to 254 μm×127 μm, it needs to be formed by machining and be fixed with a screw at the connection. For example, there is a loss of approximately 0.5 dB in WR3 (220 GHz to 325 GHz) (e.g., refer to Non Patent Literature 4.).

Moreover, there have been also reviewed resonant and waveguiding line defect modes in a two-dimensional electromagnetic band-gap slab structure for millimeter wave frequency bands (e.g., refer to Non Patent Literature 5.).

Moreover, generally in the PC waveguide, since not only the THz wave band, but also a terminal portion of the waveguide has a large refractive index difference between semiconductor and air, there is influence of light interference (Fabry-Pérot resonance) and multiple reflection due to edge face reflection (e.g., refer to Non Patent Literature 6.).

CITATION LIST

Non-Patent Literature 1: Tsukasa ISHIGAKI, Masayuki FUJITA, and Tadao NAGATSUMA, "Investigation of a Photonic-Crystal Slab for Terahertz-Wave Integrated Circuits", 2012 Institute of Electronics, Information and Communication Engineers General Conference, Okayama, no. C-14-19, 2012. (Mar. 21, 2012)

Non-Patent Literature 2: Tsukasa ISHIGAKI, Masayuki FUJITA, Masaya NAGAI, Masakaki ASHIDA, and Tadao NAGATSUMA, "Photonic-Crystal Slab for Terahertz-Wave Integrated Circuits", IEEE Photonics Conference 2012 (IPC2012), Burlingame, no. ThJ3, September 27th, pp. 774-775, 2012

Non-Patent Literature 3: Tadao NAGATSUMA, Masayuki FUJITA, Toshikazu MUKAI, Kazuisao TSURUDA, and Dai ONISHI, "Recent Progress and Future Prospects of Terahertz Communications Using Resonant Tunneling Diodes", NICT Meeting Possible Application of Terahertz Wave Technology in Industry (Tokyo) (Jan. 16, 2013)

Non-Patent Literature 4: L. B. Lok, S. Singh, A. Wilson and K. Elgaid, "Impact of waveguide aperture dimensions and misalignment on the calibrated performance of a network analyzer from 140 to 325 GHz", Microwave Measurement Conference, 2009 $73^{rd}$ ARFTG, Digital Object Identifier: 10.1109/ARFTG.2009.5278062

Non-Patent Literature 5: M. Schuster, O. Antoniuk, P. Lahl, and N. Klein, "Resonant and waveguiding defect modes in a two-dimensional electromagnetic band-gap slab structure for millimeter wave frequencies", J. Appl. Phys. 97, 044912 (2005)

Non-Patent Literature 6: Hitomichi TAKANO, Yoshihiro AKAHANE, Takashi ASANO, and Susumu NODA, "In-plane-type channel drop filter in a two-dimensional photonic crystal slab", Appl. Phys. Lett. 84, 2226 (2004)

SUMMARY OF THE INVENTION

Technical Problem

The waveguide is high-cost, and therefore there is a problem in respect of connection loss. Although metallic-transmission lines have been also proposed as THz-wave transmission lines, there is a problem in respect of absorption loss.

In the Non Patent Literature 5, although input/output propagation loss of two-dimensional electromagnetic band-gap slab structure has been reviewed in W band millimeter wavebands (from 75 GHz to 100 GHz), it is not disclosed regarding detailed structure.

Moreover, a result of influences of a light interference and multiple reflections due to the edge face reflection becomes a cause of a noise and communication band restrictions, etc., and makes use and exact estimation of devices difficult.

The object of the present invention is to provide a THz-wave connector which can reduce the connection loss in the interface between the 2D-PC slab and the waveguide, and a THz-wave IC to which such a THz-wave connector is applied.

Moreover, the object of the present invention is to provide a waveguide having nonreflective structure for controlling the influence of light interference and multiple reflections in the waveguide end, and an antenna structure to which such a waveguide is applied.

Solution to Problem

According to one aspect of the present invention, there is provided a terahertz-wave connector comprising: a 2D-PC slab; lattice points periodically arranged in the 2D-PC slab, the lattice points for diffracting terahertz waves in photonic bandgap frequencies of photonic band structure of the 2D-PC slab in order to prohibit existence in a plane of the 2D-PC slab; a 2D-PC waveguide disposed in the 2D-PC slab and formed with a line defect of the lattice points; and an adiabatic mode converter disposed at an edge face of the 2D-PC slab to which the 2D-PC waveguide extended, the 2D-PC waveguide extended to the adiabatic mode converter.

According to another aspect of the present invention, there is provided a terahertz-wave integrated circuits, wherein the terahertz-wave connector is disposed in at least one side of input and output interfaces of the 2D-PC slab.

According to still another aspect of the present invention, there is provided a waveguide comprising: a 2D-PC slab; lattice points periodically arranged in the 2D-PC slab, the lattice points for diffracting light waves or terahertz waves in photonic bandgap frequencies of photonic band structure of the 2D-PC slab in order to prohibit existence in a plane of the 2D-PC slab; a 2D-PC waveguide disposed in the 2D-PC slab and formed with a line defect of the lattice points; and an adiabatic mode converter disposed at an edge face of the 2D-PC slab to which the 2D-PC waveguide extended, the 2D-PC waveguide extended to the adiabatic mode converter.

According to yet another aspect of the present invention, there is provided an antenna structure comprising: a 2D-PC slab; lattice points periodically arranged in the 2D-PC slab, the lattice points for diffracting light waves or terahertz waves in photonic bandgap frequencies of photonic band structure of the 2D-PC slab in order to prohibit existence in a plane of the 2D-PC slab; a 2D-PC waveguide disposed in the 2D-PC slab and formed with a line defect of the lattice points; and an adiabatic mode converter disposed at an edge face of the 2D-PC slab to which the 2D-PC waveguide extended, the 2D-PC waveguide extended to the adiabatic mode converter.

Advantageous Effects of Invention

According to the present invention, there can be provided the THz-wave connector which can reduce the connection loss in the interface between the 2D-PC slab and the waveguide, and the THz-wave IC to which such a THz-wave connector is applied.

According to the present invention, there can be provided the waveguide having nonreflective structure for controlling the influence of light interference and multiple reflections in the waveguide end, and the antenna structure to which such a waveguide is applied.

BRIEF DESCRIPTION OF DRAWINGS

FIG. 5 is a schematic plane configuration diagram showing a THz-wave connector according to a modified example 1 of the first embodiment.
FIG. 6 is a schematic plane configuration diagram showing a THz-wave connector according to a modified example 2 of the first embodiment.

DESCRIPTION OF EMBODIMENTS

Figure 1:
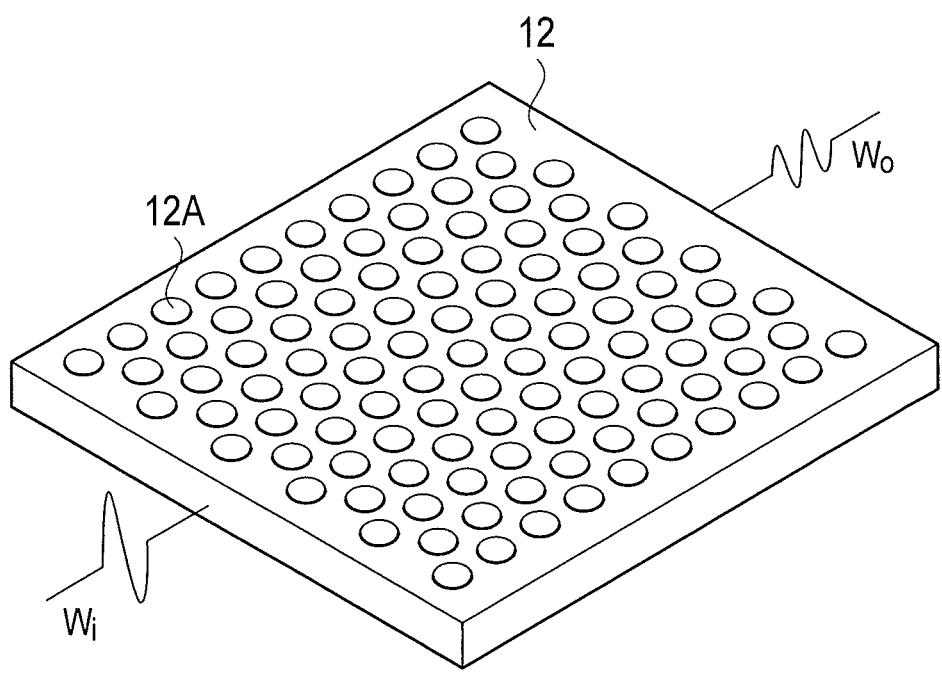
FIG. 1 is a schematic bird's-eye view of a 2D-PC slab according to a basic technology.

There will be described embodiments of the present invention, with reference to the drawings. In the following drawings, same blocks or elements are designated by same reference characters to eliminate redundancy and for simplicity. However, it should be known about that the drawings are schematic and are differ from an actual thing. Of course, the part from which the relation and ratio of a mutual size differ also in mutually drawings is included.

The embodiments to be described hereinafter exemplify the apparatus and method for a technical concept or spirit of the present invention; and do not specify dispositions, etc. of each component part as examples mentioned below. The embodiments of the present invention may be changed without departing from the spirit or scope of claims.

[First Embodiment]

A 2D-PC slab 12 according to basic technology includes structure in which lattice points 12A having periodic structure of the same degree as a wavelength of THz waves are formed in the 2D-PC slab 12, as shown in FIG. 1. In an example of FIG. 1, the lattice points 12A having the periodic structure have a triangular lattice. Since the 2D-PC slab 12 according to the basic technology inputs a terahertz (THz) input wave $W_i$ smaller than the wavelength (smaller than $\lambda/4$) from an edge face and outputs a terahertz (THz) output wave $W_o$ as shown in FIG. 1, the coupling loss in input and output interfaces is relatively large. The coupling efficiency in the input and output interfaces is equal to or less than approximately several percent.

(Device Structure)

Figure 2:
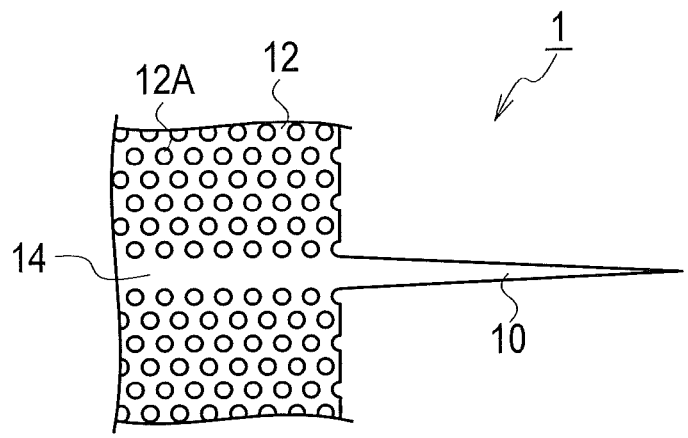
FIG. 2 is a schematic plane configuration diagram showing a THz-wave connector according to a first embodiment.

As shown in FIG. 2, the THz-wave connector 1 according to the first embodiment includes: a 2D-PC slab 12; lattice points 12A periodically arranged in the 2D-PC slab 12, the lattice points 12A for diffracting the THz waves in photonic bandgap (PBG) frequencies of photonic band structure of the 2D-PC slab 12 in order to prohibit existence in a plane of the 2D-PC slab 12; a 2D-PC waveguide 14 disposed in the 2D-PC slab 12 and formed with a line defect of the lattice points 12A; and an adiabatic mode converter 10 disposed at an edge face of the 2D-PC slab 12 to which the 2D-PC waveguide 14 extended, the 2D-PC waveguide 14 extended to the adiabatic mode converter 10.

In the THz-wave connector 1 according to the first embodiment, as shown in FIG. 2, the adiabatic mode converter 10, in a planar view of the 2D-PC slab 12, may have a tapered shape so that a tip part becomes thinner as being distanced from the edge face of the 2D-PC slab 12. Moreover, the side surface of the tapered shape may have an inclined plane as shown in FIG. 2.

Figure 3:
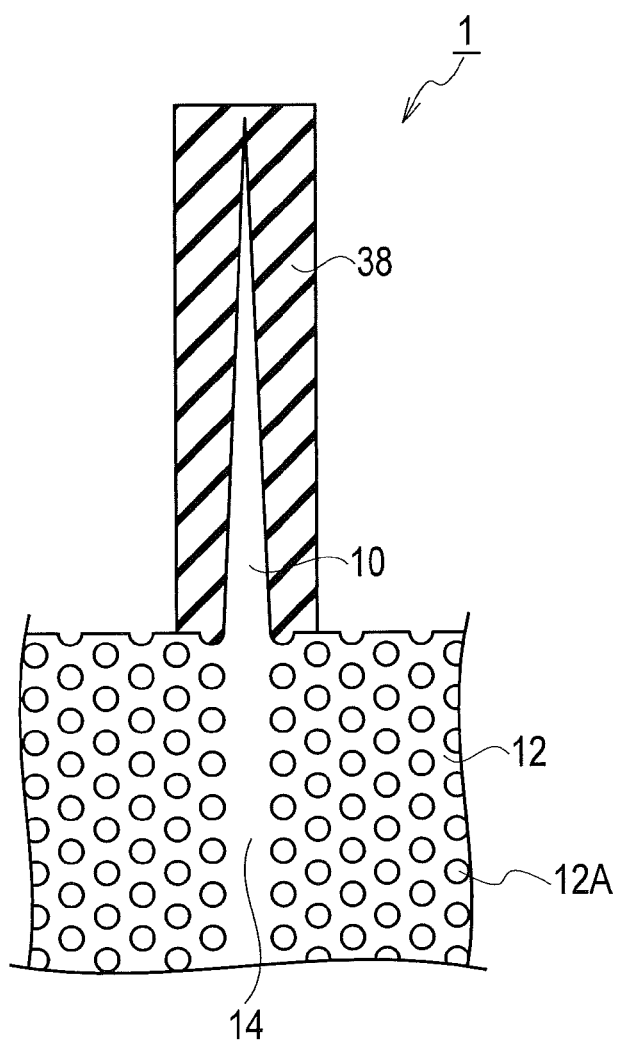
FIG. 3 is a schematic plane configuration diagram showing protective structure of the THz-wave connector according to the first embodiment.

Moreover, the THz-wave connector 1 according to the embodiment may have protective structure for covering the adiabatic mode converter 10 with a resin layer 38 etc., as shown in FIG. 3. As the resin layer 38, polymer resins, e.g. an ultraviolet (UV) curing resin or a thermosetting resin, etc. are applicable in the present embodiment, for example.

Figure 4:
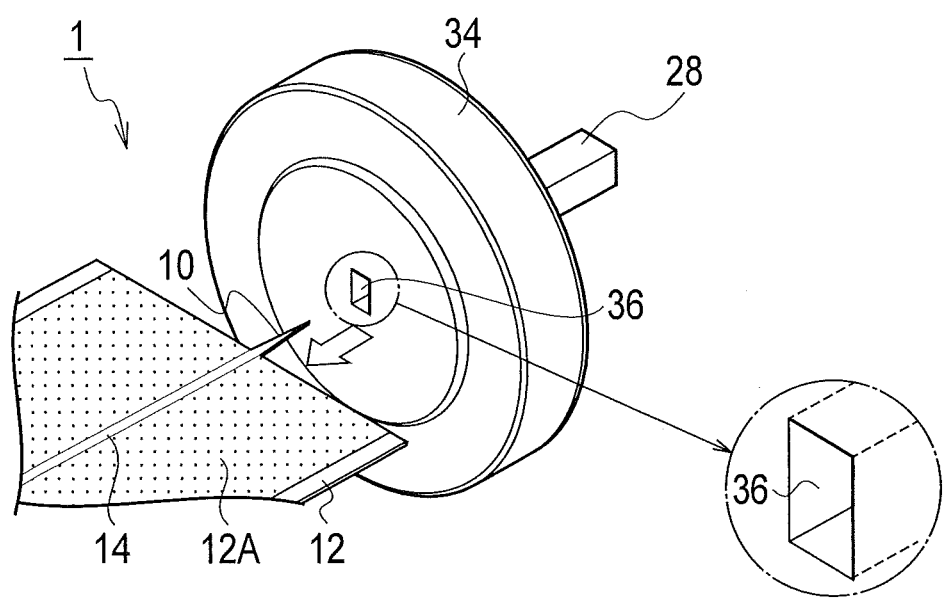
FIG. 4 is a schematic bird's-eye view configuration diagram showing an extremely low-loss interface between the THz-wave connector and a waveguide according to the first embodiment.

An extremely low-loss interface between the THz-wave connector 1 and the waveguide 28 according to the first embodiment can be achieved by inserting the adiabatic mode converter 10 formed at an edge face of the 2D-PC slab 12 into a waveguide line 36 in the waveguide 28, as shown in FIG. 4.

More specifically, according to the THz-wave connector 1 according to the first embodiment, the extremely low-loss connection to the waveguide 28 can be achieved by introducing the adiabatic mode converter 10 into the edge face of the 2D-PC slab 12, and controlling an excessive surface wave in the crystal edge face close to the waveguide flange 34 with devising the crystal edge face structure.

MODIFIED EXAMPLE 1

In the THz-wave connector 1 according to a modified example 1 in the first embodiment, as shown in FIG. 5, the adiabatic mode converter 10A, in a planar view of the 2D-PC slab 12, may have a tapered shape so that a tip part becomes thinner as being distanced from the edge face of the 2D-PC slab 12, and the side surface of the tapered shape may have a curved surface. In this case, the curved surface may have a hyperboloid surface or an exponential surface.

MODIFIED EXAMPLE 2

In the THz-wave connector 1 according to a modified example 2 in the first embodiment, as shown in FIG. 6, the adiabatic mode converter 10B, in a planar view of the 2D-PC slab 12, may have a tapered shape so that a tip part becomes thinner as being distanced from the edge face of the 2D-PC slab 12, and the side surface of the tapered shape may have a plurality of stepped surfaces.

MODIFIED EXAMPLE 3

Figure 7A:
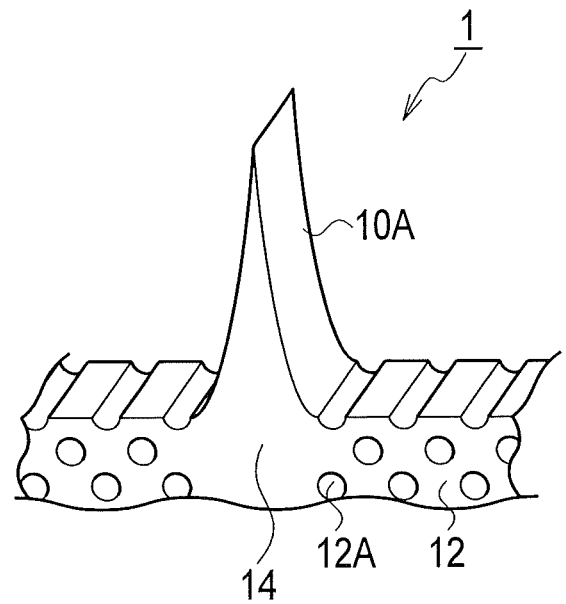
FIG. 7A is a schematic plane configuration diagram showing a THz-wave connector according to a modified example 3 of the first embodiment.

In the THz-wave connector 1 according to a modified example 3 in the first embodiment, as shown in FIG. 7A, the adiabatic mode converter 10A, in a planar view of the 2D-PC slab 12, may have a tapered shape so that a tip part becomes thinner as being distanced from the edge face of the 2D-PC slab 12, and the side surface of the tapered shape may have a curved surface. The shape shown in FIG. 7A is set up so that the length of the adiabatic mode converter 10A is relatively shorter than that of the shape shown in FIG. 5.

MODIFIED EXAMPLE 4

Figure 7B:
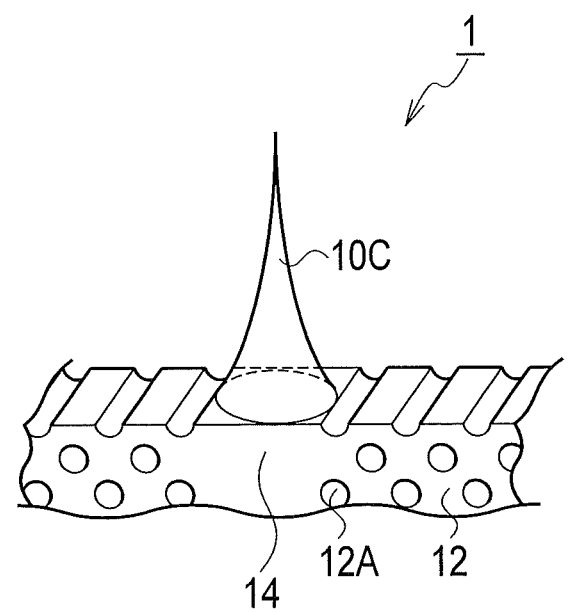
FIG. 7B is a schematic plane configuration diagram showing a THz-wave connector according to a modified example 4 of the first embodiment.

In the THz-wave connector 1 according to a modified example 4 in the first embodiment, as shown in FIG. 7B, the adiabatic mode converter 10C may have a conical shape so that the tip part becomes thinner as being distanced from the edge face of 2D-PC slab 12. In this case, the modified example of conical shape may include not only a trumpet-like shape as shown in FIG. 7B but also a simple conical shape.

MODIFIED EXAMPLE 5

Figure 8A:
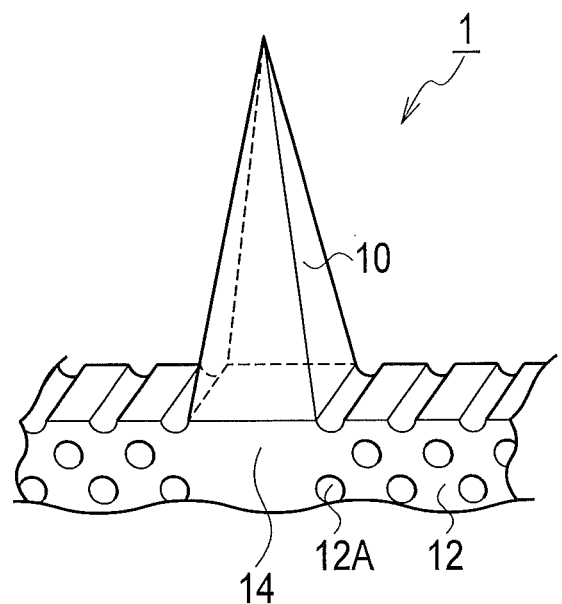
FIG. 8A is a schematic plane configuration diagram showing a THz-wave connector according to a modified example 5 of the first embodiment.

In the THz-wave connector 1 according to a modified example 5 in the first embodiment, as shown in FIG. 8A, the adiabatic mode converter 10C may have a quadrangular pyramid shape so that the tip part becomes thinner as being distanced from the edge face of 2D-PC slab 12.

MODIFIED EXAMPLE 6

Figure 8B:
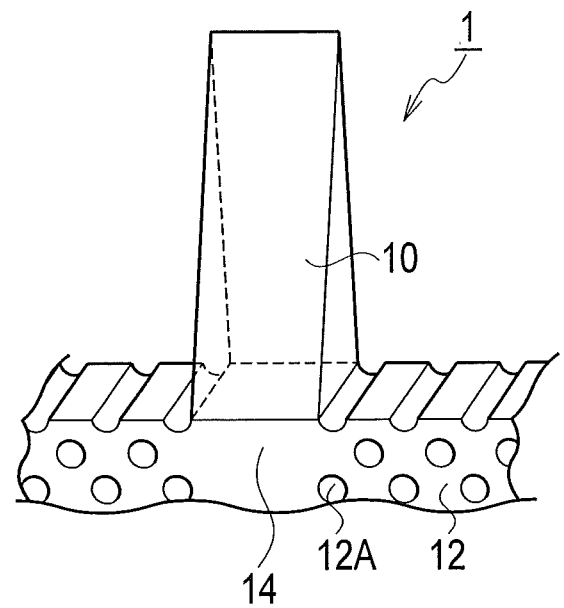
FIG. 8B is a schematic plane configuration diagram showing a THz-wave connector according to a modified example 6 of the first embodiment.

In the THz-wave connector 1 according to a modified example 6 in the first embodiment, as shown in FIG. 8B, the adiabatic mode converter 10C may have a wedge-like shape so that the thickness of the tip part becomes thinner as being distanced from the edge face of 2D-PC slab 12.

MODIFIED EXAMPLE 7

Figure 9A:
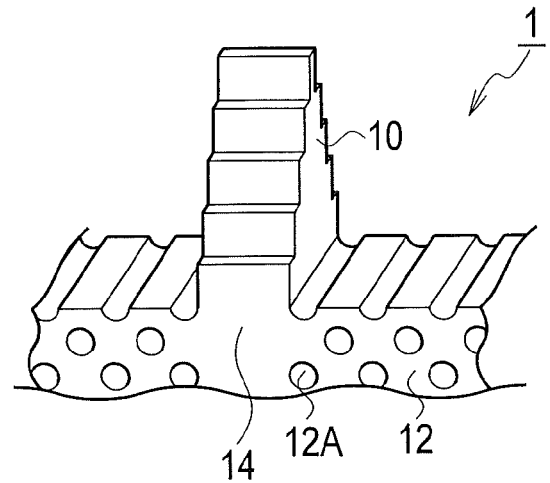
FIG. 9A is a schematic plane configuration diagram showing a THz-wave connector according to a modified example 7 of the first embodiment.

In the THz-wave connector 1 according to a modified example 7 in the first embodiment, as shown in FIG. 9A, the adiabatic mode converter 10C may have a plurality of stairs-like shapes so that the thickness of the tip part becomes thinner as being distanced from the edge face of 2D-PC slab 12.

MODIFIED EXAMPLE 8

Figure 9B:
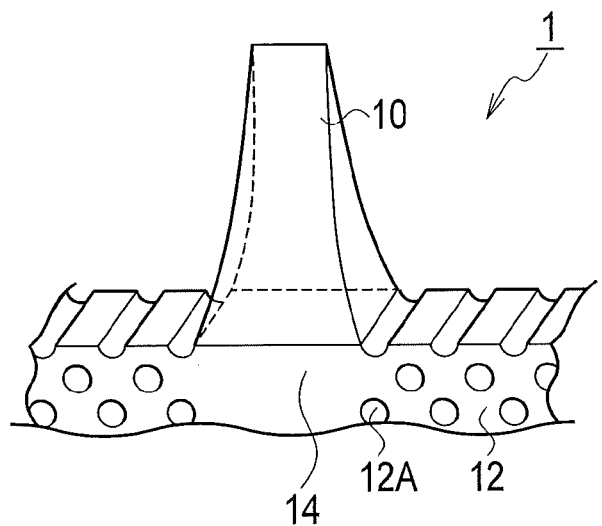
FIG. 9B is a schematic plane configuration diagram showing a THz-wave connector according to a modified example 8 of the first embodiment.

In the THz-wave connector 1 according to a modified example 8 in the first embodiment, as shown in FIG. 9B, the adiabatic mode converter 10C may have a plectrum-like shape so that the thickness of the tip part becomes thinner as being distanced from the edge face of 2D-PC slab 12. In this case, the adiabatic mode converter 10, in a planar view of the 2D-PC slab 12, may have a tapered shape so that a tip part becomes thinner as being distanced from the edge face of the 2D-PC slab 12, and the side surface of the tapered shape has a curved surface.

MODIFIED EXAMPLE 9

In the THz-wave connector 1 according to a modified example 9 in the first embodiment, as shown in FIG. 9B, the adiabatic mode converter 10C may have a wedge-like shape so that the width of the tip part becomes thinner as being distanced from the edge face of 2D-PC slab 12. In this case, the adiabatic mode converter 10, in a planar view of the 2D-PC slab 12, may have a tapered shape so that a tip part becomes thinner as being distanced from the edge face of the 2D-PC slab 12, and the side surface of the tapered shape has a inclined plane.

In the THz-wave connector 1 according to the first embodiment, the structure of the adiabatic mode converter 10 is not limited to the structures shown in FIGS. 2-9, but can also use a structure with which any one or more of such structures are combined with each other. For example, a plurality of step shapes may be introduced into the side surface of the quadrangular pyramid shape. Alternatively, the plurality of the step shape may be introduced into the side surface of the conical shape or conical trumpet-like shape.

Figure 10:
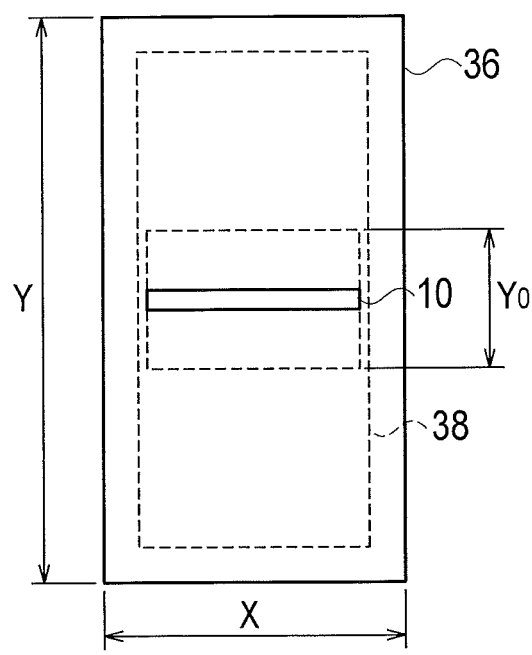
FIG. 10 is a detailed plane configuration diagram showing the extremely low-loss interface between the THz-wave connector and the waveguide according to the first embodiment.

In the THz-wave connector 1 according to the first embodiment, the adiabatic mode converter 10 covered with the resin layer 38 is inserted into the waveguide line 36, as shown in FIG. 10. In FIG. 10, the lengths X-Y of the aperture of the waveguide line 36 are approximately 0.4 mm and approximately 0.8 mm, for example. Moreover, the thickness $Y_0$ of the bottom of the adiabatic mode converter 10 is approximately 0.2 mm, for example.

The 2D-PC slab 12 is dielectric plate structure having two-dimensional periodic structure. According to such a design, a Photonic Band Gap (PBG) in which an electromagnetic mode cannot exist appears. Furthermore, the waveguide mode and the resonant mode can be introduced in the PBG by disturbing the periodic structure, and thereby a low-loss waveguide and resonator in a micro region equal to or less than the wavelength size can be achieved.

In this case, the bandwidth of the PBG depends on the refractive index of dielectrics, and has preferable high-refractive index materials.

Materials of the 2D-PC slab 12 providing the interface with the THz-wave connector 1 according to the first embodiment may be formed of semiconducting materials.

As the semiconducting materials, the following are applicable. More specifically, silicon (Si), GaAs, InP, GaN, etc. are applicable thereto, and GaInAsP/InP based, GaInAs/GaAs based, GaAlAs/GaAs based or GaInNAs/GaAs based, GaAlInAs/InP based, GaAlInP/GaAs based, GaInN/GaN based materials, etc. are applicable thereto. In particular, high resistivity Si has a high refractive index in the THz wave bands, and therefore there is little material absorption.

Figure 11A:
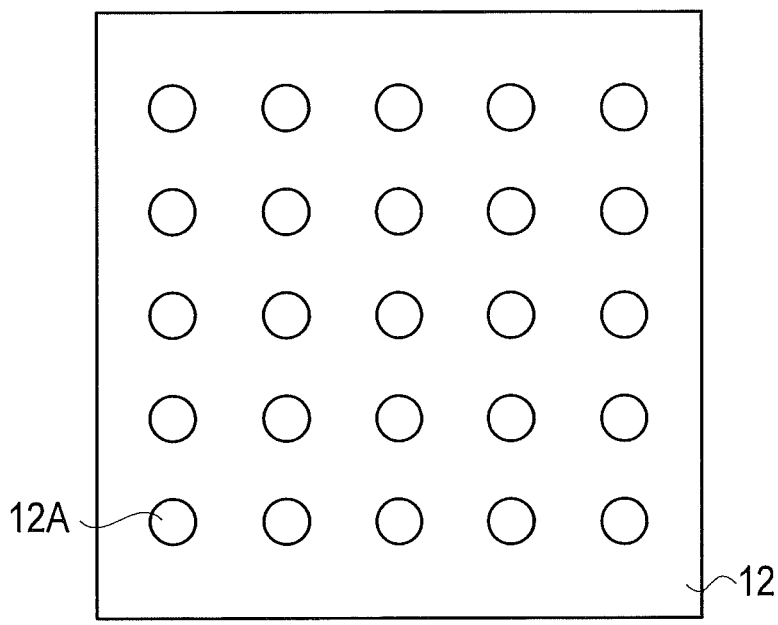
FIG. 11A shows periodic structure of lattice points of a 2D-PC slab which can apply to the THz-wave connector according to the first embodiment, and shows in particular an example of a square lattice.
Figure 11B:
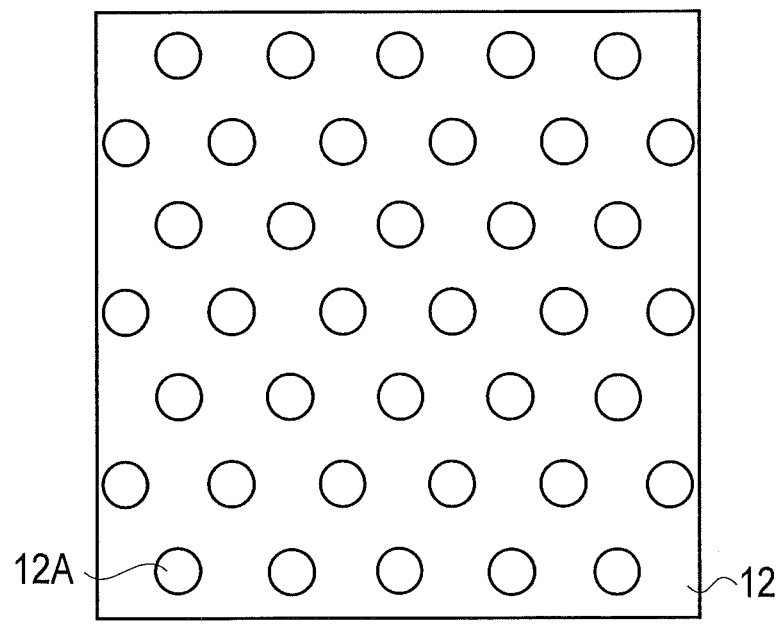
FIG. 11B shows periodic structure of lattice points of a 2D-PC slab which can apply to the THz-wave connector according to the first embodiment, and shows in particular an example of a triangular lattice.

In the periodic structure of lattice points 12A in the 2D-PC slab 12 to which the THz-wave connector 1 according to the first embodiment can be applied, an example of the square lattice is schematically illustrated as shown in FIG. 11A, and an example of the triangular lattice is schematically illustrated as shown in FIG. 11B.

Figure 12A:
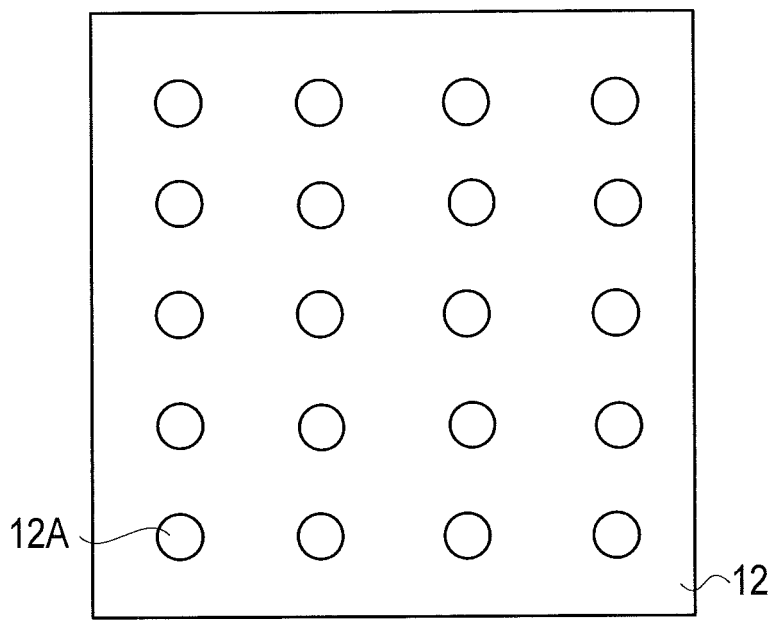
FIG. 12A shows periodic structure of lattice points of a 2D-PC slab which can apply to the THz-wave connector according to the first embodiment, and shows in particular an example of a rectangular lattice.
Figure 12B:
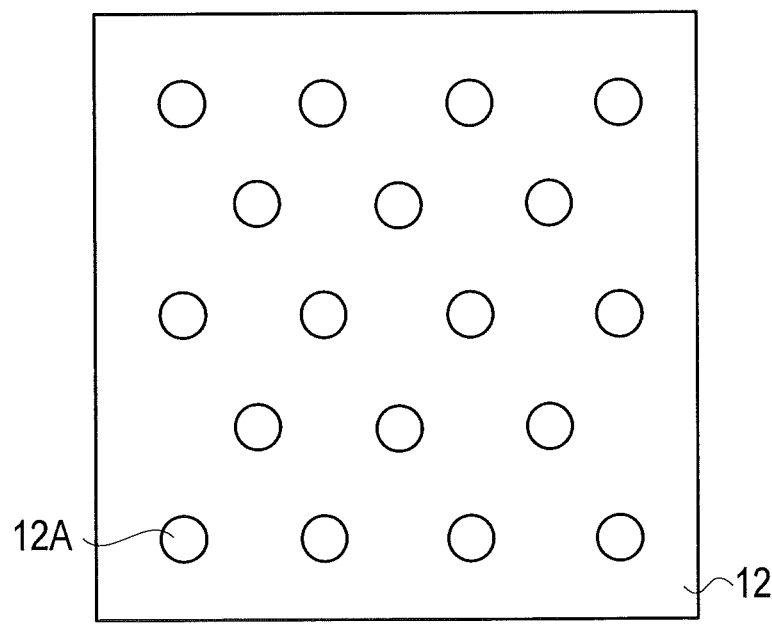
FIG. 12B shows periodic structure of lattice points of a 2D-PC slab which can apply to the THz-wave connector according to the first embodiment, and shows in particular an example of a rhombic lattice.

Moreover, in the periodic structure of lattice points 12A in the 2D-PC slab 12 to which the THz-wave connector 1 according to the first embodiment can be applied, an example of the rectangular lattice is schematically illustrated as shown in FIG. 12A, and an example of the rhombic lattice (face-centered rectangle lattice) is schematically illustrated as shown in FIG. 12B.

Moreover, the lattice points 12A of the 2D-PC slab 12 to which the THz-wave connector 1 according to the first embodiment can be applied may be provided with a hole shape of any one of the polygonal shape, circular shape, oval shape, or ellipse shape. Moreover, the hole shape of the lattice points 12A may pass there through, and may have recessed structure. Furthermore, impurities may be doped at predetermined concentration in the materials composing the 2D-PC slab 12.

Moreover, the lattice points 12A may be formed as an air hole, or may be filled up with a semiconductor layer differing in the refractive index therefrom, for example. For example, the lattice point may be formed by a GaAs layer filled up with an GaAlAs layer.

Moreover, in the THz-wave connector 1 according to the first embodiment, it is possible to adapt as the lattice point (hole) 12A not only the structure where the hole of air is formed, but the structure where (a part of) the hole is filled up with a low-refractive index (low-dielectric constant) medium.

Polymeric materials, e.g. Teflon, fluorine contained resin, a polyimide, acrylic, polyester, an epoxy resin, a liquid crystal, a polyurethane, etc. are applicable to the low-refractive index (low-dielectric constant) medium, for example. Moreover, dielectrics, e.g. $SiO_2$, SiN, SiON, an alumina, a sapphire, etc. are also applicable to the low-refractive index (low-dielectric constant) medium, for example. Moreover, porous bodies, e.g. an aerogel, etc. are also applicable to the low-refractive index (low-dielectric constant) medium.

Moreover, layered structure for sandwiching the top and bottom principal surfaces of the 2D-PC slab 12 with the low-refractive index medium may be adopted, in the THz-wave connector 1 according to the first embodiment.

Moreover, layered structure for adding the low-refractive index medium only to the top surface or the bottom surface among the top and bottom principal surfaces of the 2D-PC slab 12 is also applicable, in the THz-wave connector 1 according to the first embodiment.

Moreover, a configuration in which the 2D-PC slab 12 is mounted on a low-refractive index printed circuit board may be adopted, in the THz-wave connector 1 according to the first embodiment.

Moreover, layered structure for sandwiching the top and bottom principal surfaces of the 2D-PC slab 12 with a metal may be adopted, in the THz-wave connector 1 according to the first embodiment.

Moreover, layered structure for adding the metal only to the top surface or the bottom surface among the top and bottom principal surfaces of the 2D-PC slab 12 is also applicable, in the THz-wave connector 1 according to the first embodiment. Although the absorption loss due to the metal increases in the THz band, the above-mentioned configuration for laminating the metal may be adopted since the absorption loss is not higher than that of the light wave region.

Moreover, not only the semiconductor materials but also the high-refractive index medium can be applied, as the materials of the 2D-PC slab 12. For example, magnesium oxide (MgO) is applicable to the 2D-PC slab 12 since the refractive index in the THz wave band becomes approximately 3.1 which is high dielectric (insulator).

(Experimental System of Spectroscopy)

Figure 13:
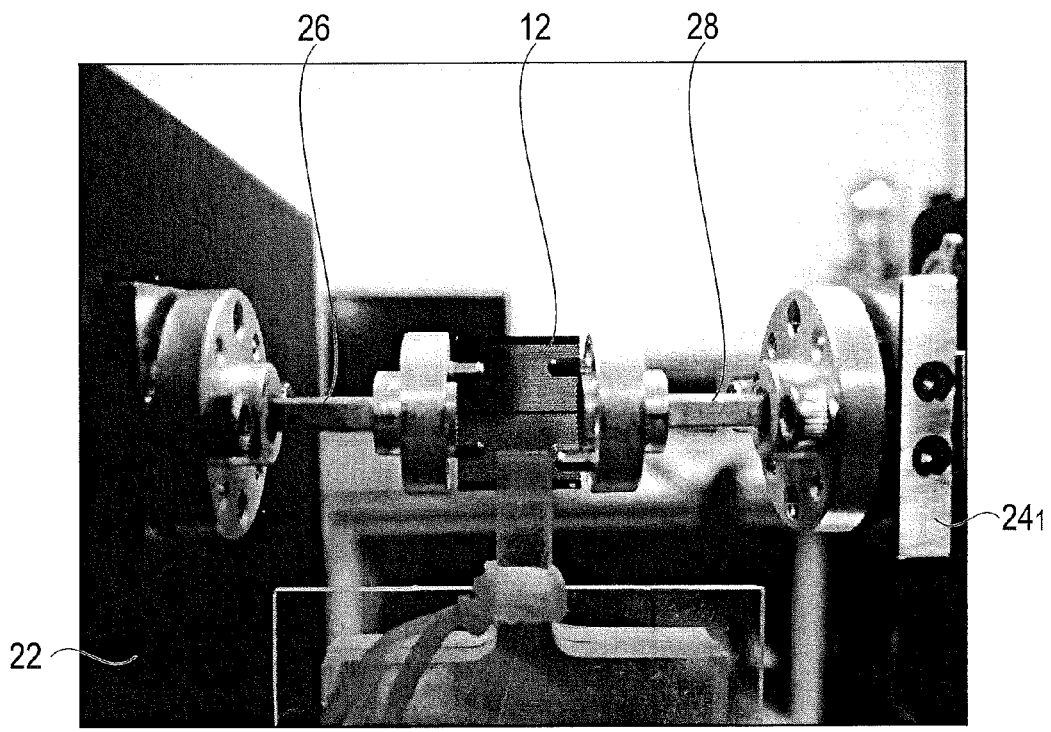
FIG. 13 shows an example of a photograph of an experimental system of a spectroscopy using a 2D-PC slab providing input/output interfaces with the THz-wave connector according to the first embodiment.

FIG. 13 shows a photograph example of an experimental system of a spectroscopy using the 2D-PC slab providing input/output interfaces with the THz-wave connector according to the first embodiment. Moreover, a schematic block configuration corresponding to FIG. 13 is illustrated as shown in FIG. 14.

Figure 14:
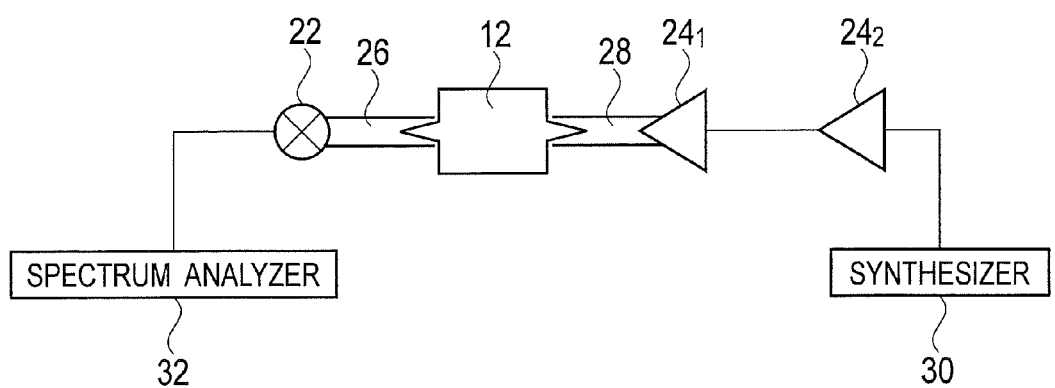
FIG. 14 is a schematic block configuration diagram corresponding to FIG. 13 of the experimental system using the 2D-PC slab providing the input/output interfaces with the THz-wave connector according to the first embodiment.

As shown in FIGS. 13 and 14, the spectroscopy using the 2D-PC slab 12 providing the input/output interfaces with the THz-wave connector 1 according to the first embodiment includes: a millimeter-wave generator (synthesizer) 30; a multiplier (×3) $24_2$ connected to the synthesizer 30; a multiplier (×3) $24_1$ connected to the multiplier $24_2$; a waveguide 28 connected to the multiplier $24_1$; a 2D-PC slab 12 connected to the waveguide 28; a waveguide 26 connected to the 2D-PC slab 12; a mixer 22 connected to the waveguide 26; and a spectrum analyzer 32 connected to the mixer 22.

The 2D-PC waveguide 14 approximately 19 mm in the length having a tapered structure was fabricated as input/output structure to the waveguides 26, 28 using a Si substrate having the resistivity of 3000 ωcm. Moreover, a 2D-PC slab without the 2D-PC waveguide 14 was also fabricated for a comparison therewith.

The spectroscopic system (FIGS. 13 and 14) composed of the millimeter-wave generator (synthesizer) 30, the multipliers $24_1$, $24_2$, the spectrum analyzer 32, and the WR3 waveguides 26, 28 are used; the 2D-PC slab (sample) 12 providing the input/output interfaces with the fabricated THz-wave connector 1 according to the first embodiment is connected with the waveguides 26, 28; the input signal frequency from the multiplier $24_1$ to the 2D-PC slab (sample) 12 is varied in a range from 0.28 THz to 0.39 THz; and thereby transmission characteristics were measured by the spectrum analyzer 32.

(Transmission Characteristics Depending on the Existence or Nonexistence of THz-wave Connector)

Figure 15:
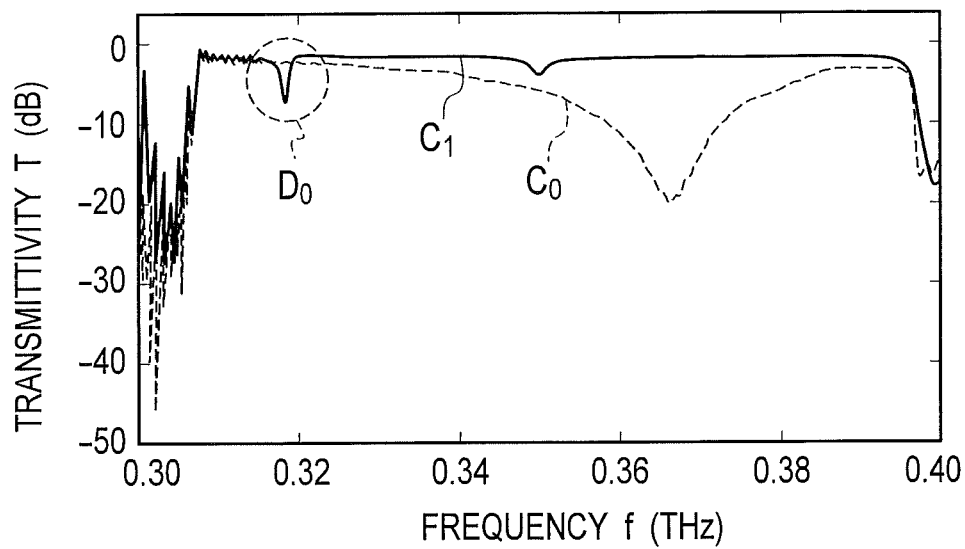
FIG. 15 shows an example of characteristics of a relationship between a transmissivity T and a frequency f, between the 2D-PC slab and the waveguide depending on an existence or nonexistence of the THz-wave connector according to the first embodiment ($C_0$: the case where there is no THz-wave connector; and $C_1$: the case where there is the THz-wave connector).

FIG. 15 shows a relationship between the transmissivity T and the frequency f, between the 2D-PC slab 12 and the waveguides 26, 28 depending on the existence or nonexistence of the THz-wave connector 1 according to the first embodiment. In FIG. 15, the curved line $C_0$ corresponds to the case where there is no THz-wave connector 1, and the curved line $C_1$ corresponds to the case where there is the THz-wave connector 1 and the case where there is no suitable gap between the THz-wave connector 1 and the waveguide flange 40, 34. The structure of the THz-wave connector 1 has the similar configuration as that of FIG. 2, and the length of the adiabatic mode converter 10 (taper length $L_1$) is approximately 3 mm.

As clearly from FIG. 15, the transmissivity T increases by introducing the THz-wave connector 1 according to the first embodiment. Note that the transmissivity reduction of approximately 6 dB is observed in specific frequencies of a $D_0$ portion on the curved line.

Figure 22:
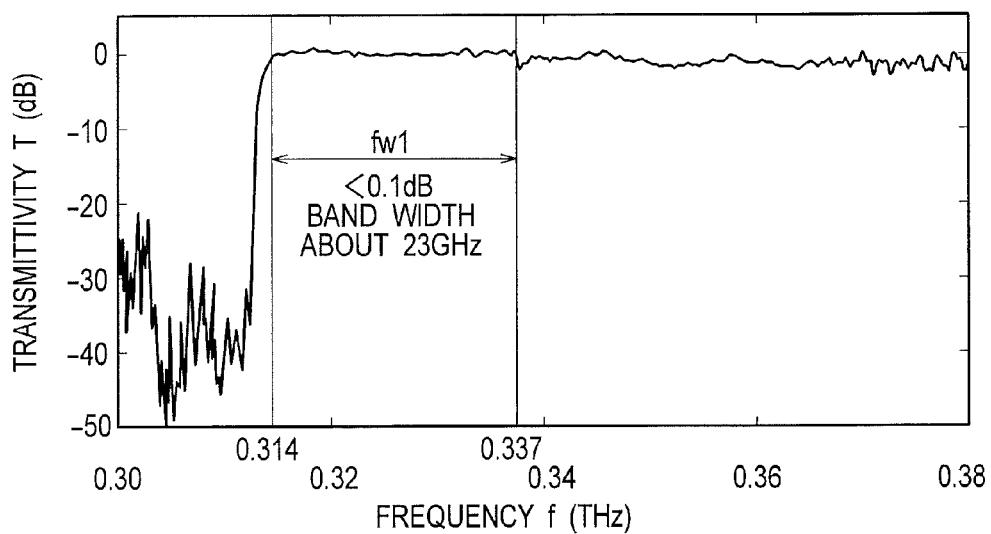
FIG. 22 shows an experimental result of the frequency characteristics of the transmissivity of the 2D-PC slab to which the THz-wave connector according to the first embodiment is applied (in the case where there is a suitable gap between the THz-wave connector and the waveguide flange).

The combined state with the surface wave varies and the frequencies to which the transmissivity is reduced varies by shortening the length of the adiabatic mode converter 10 (taper length $L_1$). However, a phenomenon in which the transmissivity T becomes lower appears. By providing the suitable gap between the THz-wave connector 1 and the waveguide flange 40, 34, as shown in FIG. 22 described below, the extremely low-loss transmission characteristics of equal to or less than 0.1 dB are obtained within a range of approximately 23 GHz equivalent to the band fw1 ranging from 0.314 THz to 0.337 THz, thereby improving also the phenomenon in which the transmissivity T becomes lower.

(Transmission Characteristics Depending on the Existence or Nonexistence of Gap Between THz-wave Connector and Waveguide Flange)

Figure 16:
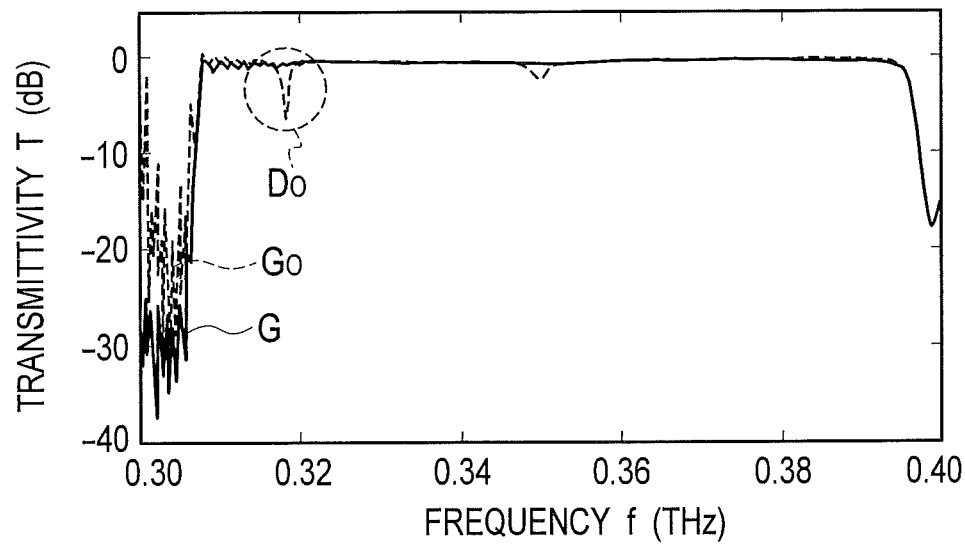
FIG. 16 shows an example of characteristics of a relationship between the transmissivity T and the frequency f, between the 2D-PC slab and the waveguide in the THz-wave connector according to the first embodiment ($G_0$: the case where there is no gap between the THz-wave connector and the waveguide flange; and G: the case where there is a gap between the THz-wave connector and the waveguide flange).

FIG. 16 shows a relationship between the transmissivity T and the frequency f, between the 2D-PC slab 12 and the waveguide 26 depending on the existence or nonexistence of a gap between the THz-wave connector 1 and the waveguide flange 40 according to the first embodiment. In FIG. 16, the curved, dashed line $G_0$ corresponds to the case where there is no gap between the THz-wave connector 1 and the waveguide flange 40 (FIG. 17), and the curved, solid line G corresponds to the case where there is a gap between the THz-wave connector 1 and the waveguide flange 40 (FIG. 18). In this case, the length of the adiabatic mode converter 10 (taper length $L_1$) is approximately 3 mm.

Figure 17:
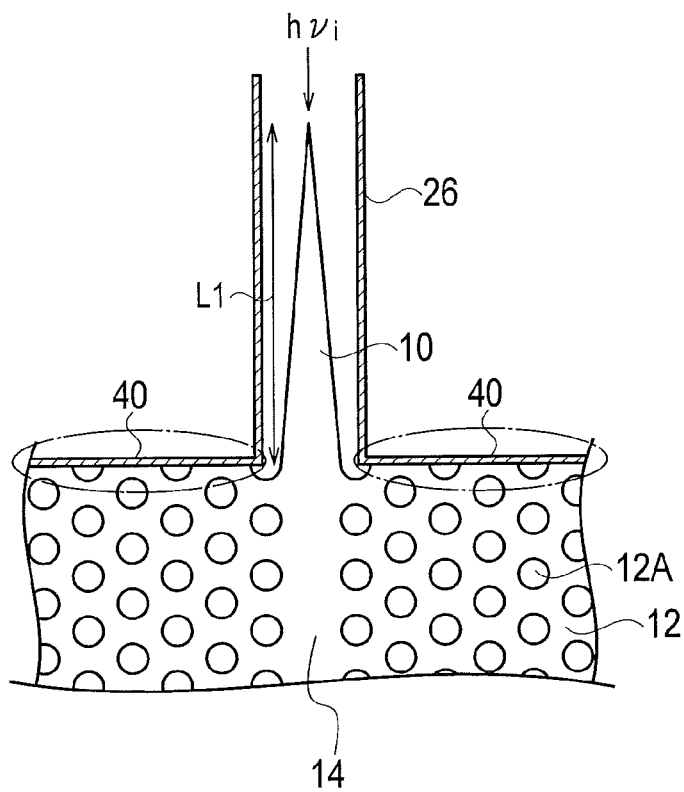
FIG. 17 is a schematic plane configuration diagram in the case where there is no gap between the THz-wave connector and the waveguide flange according to the first embodiment.
Figure 18:
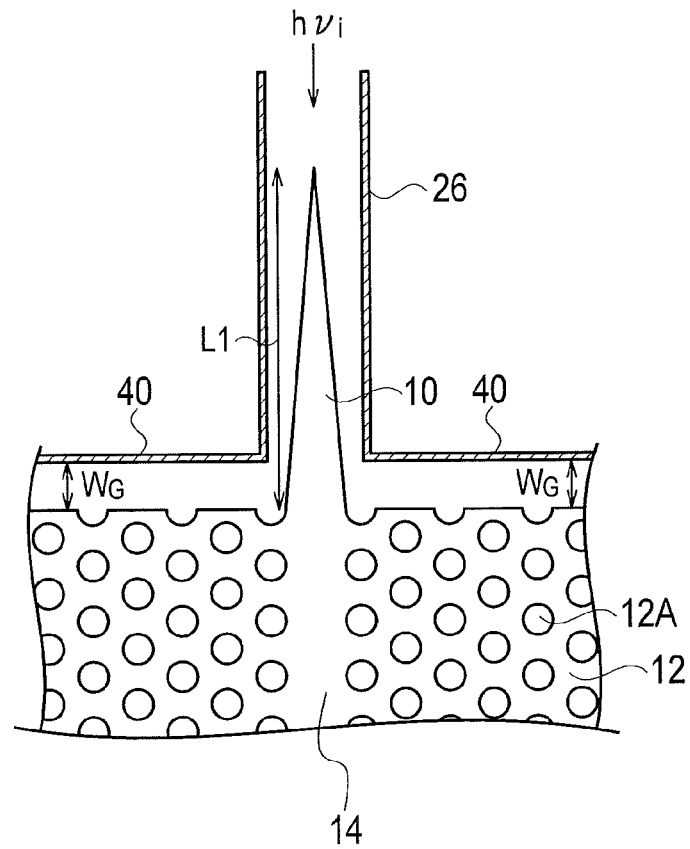
FIG. 18 is a schematic plane configuration diagram in the case where there is a gap between the THz-wave connector and the waveguide flange according to the first embodiment.

In the case of there is no gap between the THz-wave connector 1 and the waveguide flange 40, as shown in FIG. 17, the waveguide flange 40 contacts with the edge face of the 2D-PC slab 12. On the other hand, in the case where there is a gap between the THz-wave connector 1 and the waveguide flange 40, as shown in FIG. 18, the waveguide flange 40 is disposed to be distanced at the gap distance $W_G$ from the edge face of the 2D-PC slab 12.

In the case of there is no gap between the THz-wave connector 1 and the waveguide flange 40, as shown in FIG. 17, the waveguide flange 40 contacts with the edge face of 2D-PC slab 12. Accordingly, reduction in the transmissivity in the specific frequencies is observed due to excitation of a surface mode of the THz input wave $hv_i$.

On the other hand, in the case where there is a gap between the THz-wave connector 1 and the waveguide flange 40, as shown in FIG. 18, the waveguide flange 40 is disposed to be distanced at the gap distance $W_G$ from the edge face of the 2D-PC slab 12. Accordingly, the surface mode of the THz input wave $hv_i$ can be controlled. In particular, it is preferable to be set as the gap distance $W_G$>the wavelength/3.

In the configuration shown in FIGS. 17 and 18, the structure of the THz-wave connector 1 has the similar configuration as that of FIG. 2, and the length $L_1$ of the adiabatic mode converter 10 is approximately 3 mm.

In the THz-wave connector 1 according to the first embodiment, the adiabatic mode converter 10 is introduced into the edge face of the 2D-PC slab 12; the crystal edge face structure is devised; the waveguide flange 40 is disposed to be distanced at the gap distance $W_G$ from the edge face of the 2D-PC slab 12; and the excessive surface wave is controlled in the crystal edge face close to the waveguide flange 40; thereby achieving the extremely low-loss connection with the waveguide 26.

MODIFIED EXAMPLE 10

The gap structure shown in FIG. 18 may be formed only in a peripheral part of the adiabatic mode converter 10.

Figure 19:
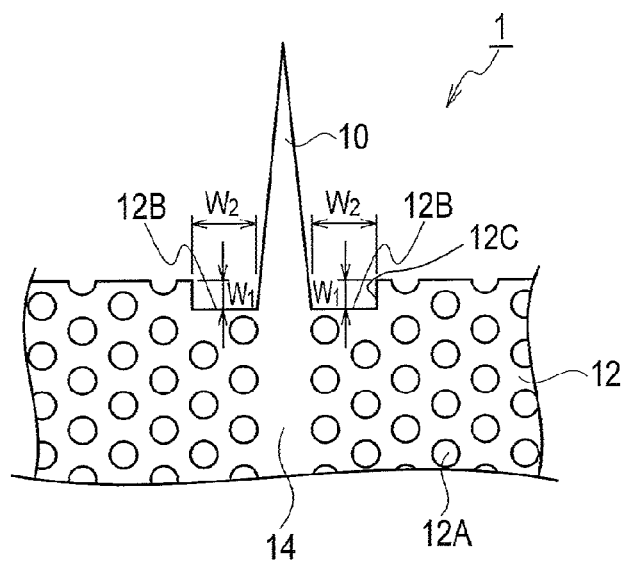
FIG. 19 is a schematic plane configuration diagram showing a THz-wave connector according to a modified example 10 of the first embodiment.

A schematic plane configuration of a THz-wave connector 1 according to a modified example 10 of the embodiment is illustrated as shown in FIG. 19.

In the THz-wave connector 1 according to the modified example 10 of the first embodiment, in order to form a gap area 12B which is a bottom surface of a recess structure (recess portion) 12C, the recess structure 12C having the depth (gap distance) $W_1$ and the length $W_2$ in the edge face direction is formed in the edge face of the 2D-PC slab 12 at the base portion of the adiabatic mode converter (protruding portion) 10. More specifically, as shown in FIG. 19, in the peripheral part of the base of the adiabatic mode converter 10, the gap distance $W_1$ may be formed between the edge face of the 2D-PC slab 12 where the adiabatic mode converter 10 is disposed and the waveguide flange (40) disposed in the edge face of the 2D-PC slab 12, and thereby the edge face of the 2D-PC slab 12 may be distanced from the waveguide flange.

In the THz-wave connector 1 according to the modified example 10 of the first embodiment, the adiabatic mode converter 10 is introduced into the edge face of the 2D-PC slab 12, the crystal edge face structure is devised, the waveguide flange 40 is disposed to be distanced at the gap distance $W_1$ from the edge face of the 2D-PC slab 12. Thus, the excessive surface wave is controlled in the crystal edge face close to the waveguide flange 40, thereby achieving the extremely low-loss connection with the waveguide 26. In particular, it is preferable to be set as the gap distance $W_1$>the wavelength/3.

(Theoretical Analysis Results)

Figure 20:
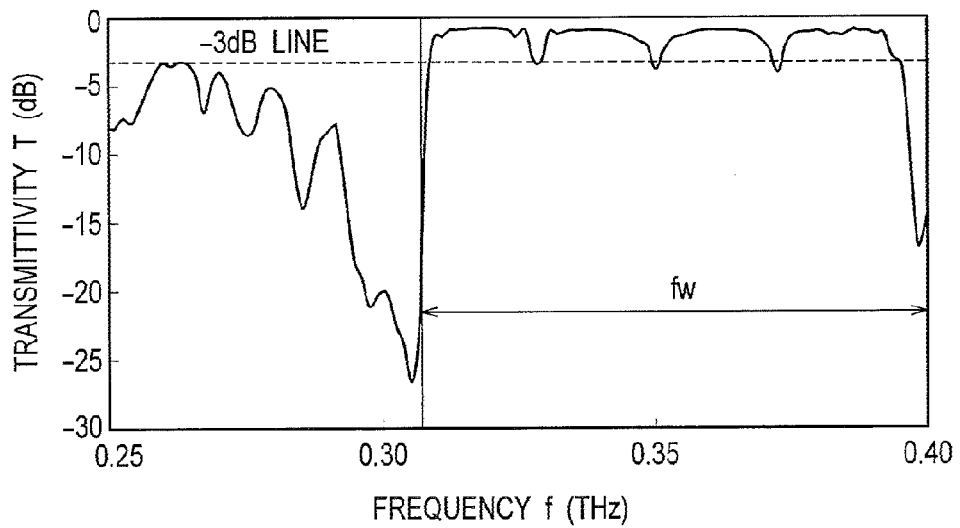
FIG. 20 shows a theoretical analysis results of the frequency characteristics of a transmissivity of the THz-wave connector according to the first embodiment (in the case of where there is no suitable gap between the THz-wave connector and the waveguide flange).

FIG. 20 shows a theoretical analysis results of the frequency characteristics of a transmissivity of the THz-wave connector 1 according to the first embodiment (in the case of where there is no suitable gap between the THz-wave connector and the waveguide flange). In FIG. 20, the band fw indicates a band on the basis of the PBG of the 2D-PC waveguide 14. In this case, the taper length $L_1$=4.5 mm.

The THz-wave connector 1 according to the embodiment can obtain low-loss of equal to or less than 3 dB through the whole of the waveguide band of the 2D-PC waveguide 14. In particular, if the Fabry-Perot resonance in the 2D-PC waveguide 14 can be controlled, the low-loss of equal to or less than 0.3 dB can be obtained.

(Experimental Results)

Figure 21:
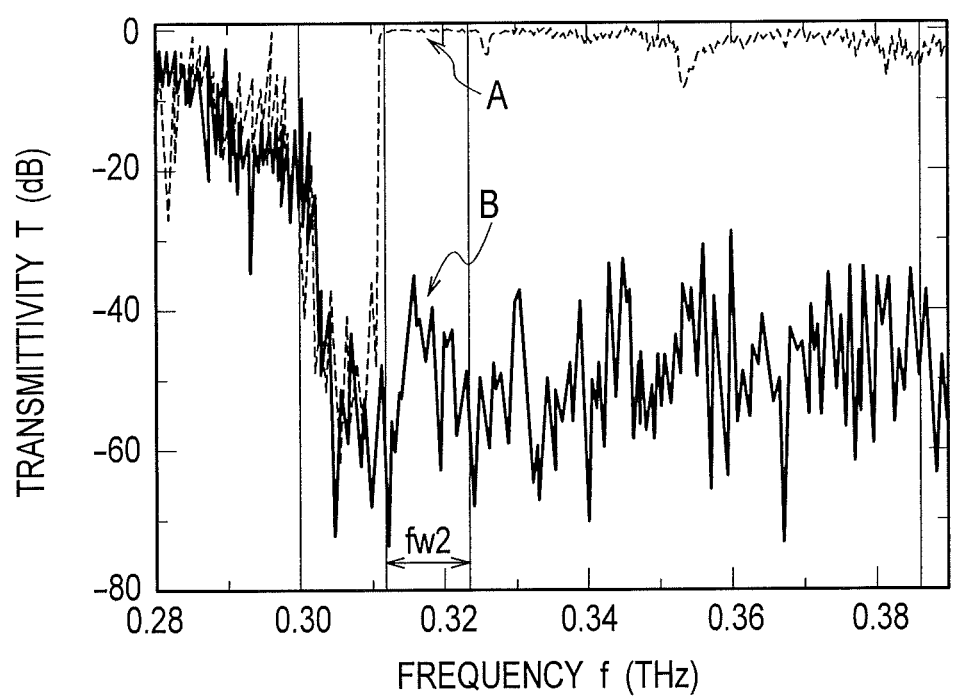
FIG. 21 shows an experimental result of the frequency characteristics of the transmissivity of the 2D-PC slab to which the THz-wave connector according to the first embodiment is applied (A: 2D-PC waveguide+THz-wave connector; and B: 2D-PC waveguide-less+THz-wave connector).

FIG. 21 shows an experimental result of the frequency characteristics of transmissivity T in the 2D-PC slab 12 to which the THz-wave connector 1 according to the first embodiment is applied. In FIG. 21, the curved line A corresponds to a configuration of the 2D-PC waveguide+THz-wave connector, and the curved line B correspond to a configuration of 2D-PC waveguide-less+THz-wave connector.

As shown in FIG. 21, since the propagation in the PBG band (0.30 THz to 0.39 THz) is prohibited in the case where there is no 2D-PC waveguide 14 (curved line B), the transmissivity T (dB) in the PBG band is approximately from −40 dB to −60 dB which is extremely low. On the other hand, in the case where there is the 2D-PC waveguide 14 (curved line A), the waveguide mode equal to or greater than 0.31 THz which becomes the propagation region appears, extremely low-loss characteristics of equal to or less than approximately 1 dB are obtained in particular in a range from 0.311 THz to 0.325 THz shown with fw2 in FIG. 21.

Furthermore, FIG. 22 shows an experimental result of the frequency characteristics of the transmissivity of the 2D-PC slab to which the THz-wave connector according to the first embodiment is applied (in the case where there is a suitable gap between the THz-wave connector and the waveguide flange). In FIG. 22, the band fw1 is equivalent to a band ranging from 0.314 THz to 0.337 THz. As clearly from FIG. 22, the extremely low-loss transmission characteristics of equal to or less than 0.1 dB are obtained within the range of approximately 23 GHz equivalent to the band fw1.

(Relationship Between Lattice Constant and Operable Frequencies)

The 2D-PC waveguide is formed by introducing the line defect into the periodic structure of a dielectric plate structure having two-dimensional periodic structure. It is possible to confine electromagnetic waves in the dielectrics due to the PBG effect that an electromagnetic mode in the in-plane direction cannot exist and the total reflection effect in the vertical up-and-down direction to the 2D-PC slab planar. Accordingly, the propagation loss of the 2D-PC waveguide is small.

Figure 23:
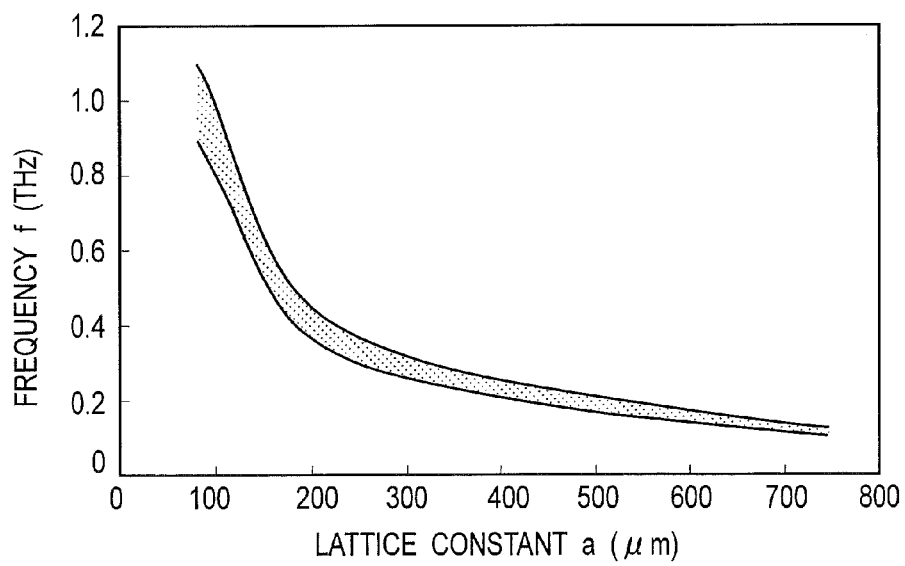
FIG. 23 shows an electromagnetic field simulation result of a relationship between the lattice constant a in the lattice points which are periodically arranged in the 2D-PC slab to which the THz-wave connector according to the first embodiment can be applied, and the waveguide band frequency f of the 2D-PC waveguide.

FIG. 23 shows an electromagnetic field simulation result of a relationship between the lattice constant a in the lattice points 12A which are periodically arranged in the 2D-PC slab 12 to which the THz-wave connector according to the first embodiment can be applied, and the waveguide band frequency f of the 2D-PC waveguide 14.

As shown in FIG. 23, the operational frequency band can be varied to higher frequency by making the lattice constant small. For example, the operation are possible ranging from approximately 0.9 to approximately 1.1 THz in the lattice constant a=80 μm, ranging from approximately 0.31 THz to approximately 0.38 THz in the lattice constant a=240 μm (experiment structure), and ranging from approximately 0.10 THz to approximately 0.12 THz in the lattice constant a=750 μm.

According to the electromagnetic field simulation result of the relationship between the lattice constant a of the lattice points 12A and the PGB frequency which are periodically arranged in the 2D-PC slab 12 to which the THz-wave connector according to the first embodiment can be applied, the PGB frequency band can be varied to higher frequency by making the lattice constant small. For example, the PGB frequency band appears ranging from approximately 0.9 THz to approximately 1.1 THz in the lattice constant a=80 μm, ranging from approximately 0.30 THz to approximately 0.38 THz in the lattice constant a=240 μm (experiment structure), and ranging from approximately 0.10 THz to approximately 0.13 THz in the lattice constant a=720 μm.

(Relationship Between Propagation Loss and Resistivity of Silicon)

Figure 24:
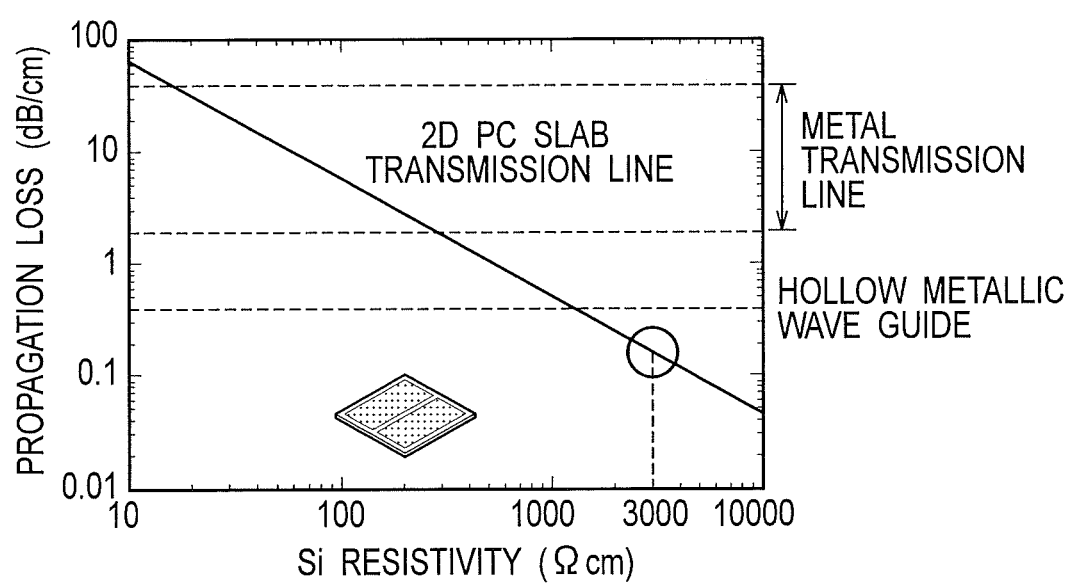
FIG. 24 is a diagram showing a relationship between a propagation loss, and a resistivity of silicon in the case of using the silicon as a material of the 2D-PC slab to which the THz-wave connector according to the first embodiment can be applied.

FIG. 24 shows an electromagnetic field simulation result of a relationship between the propagation loss and the Si resistivity in the case of using Si as a material of the 2D-PC slab 12 which the THz-wave connector 1 according to the first embodiment can be applied. FIG. 24 shows a result of calculating the propagation loss (dB/cm) with respect to the Si resistivity (ωcm) by electromagnetic field simulation, in consideration of the absorption loss of Si composing the 2D-PC with the Drude Model (Drude model). In this case, a circular triangular lattice of 144 μm in diameter was arranged with the lattice constant a=240 μm, and the 2D-PC slab having the PBG band ranging from 0.30 THz to 0.39 THz was used for Si of 200 μm in thickness.

FIG. 24 proves that the propagation loss becomes not more than 0.2 (dB/cm), in the Si resistivity equal to or greater than 3000 ωcm. The aforementioned value is a small value as compared with a metallic-transmission line and a waveguide to which a metallic absorption loss of 0.3 THz in frequencies affects. More specifically, it proves that the 2D-PC waveguide can sufficiently be applied as the transfer line for the THz-wave IC. In particular, the 2D-PC waveguide 14 using high resistivity Si is extremely low-loss.

(THz-wave IC)

The THz-wave connector 1 according to the first embodiment is applicable to a THz-wave IC.

Figure 25:
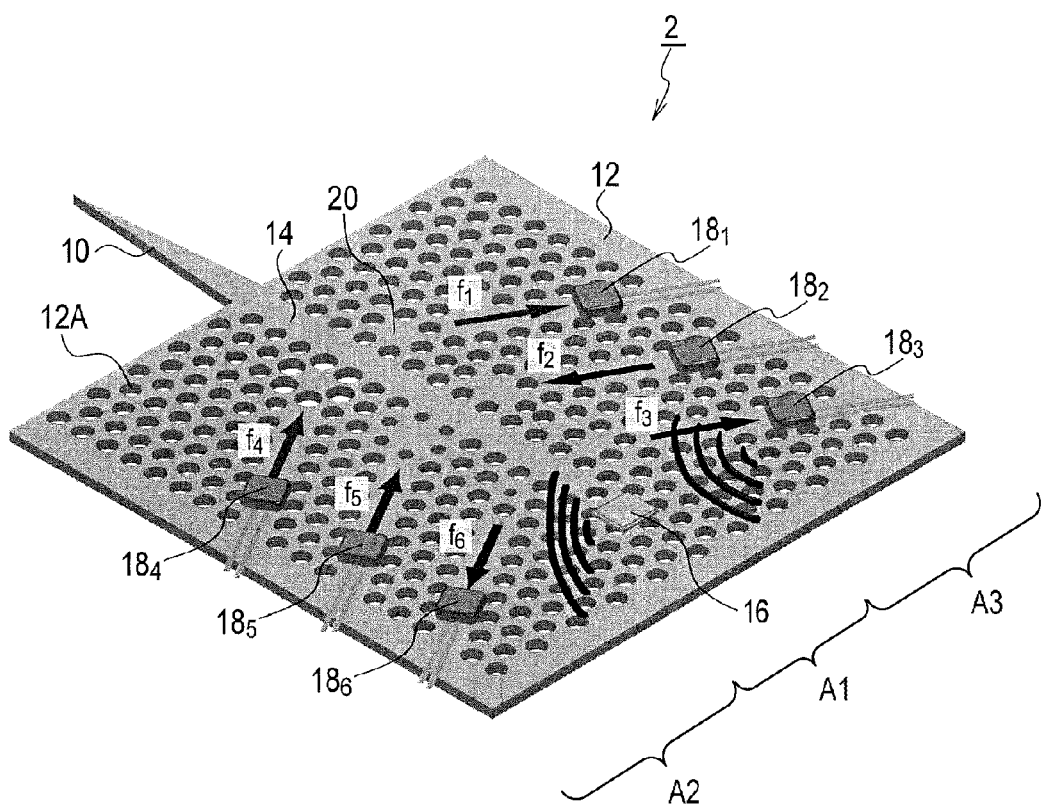
FIG. 25 is a schematic bird's-eye view showing a THz-wave IC to which the THz-wave connector according to the first embodiment is applied.
Figure 26:
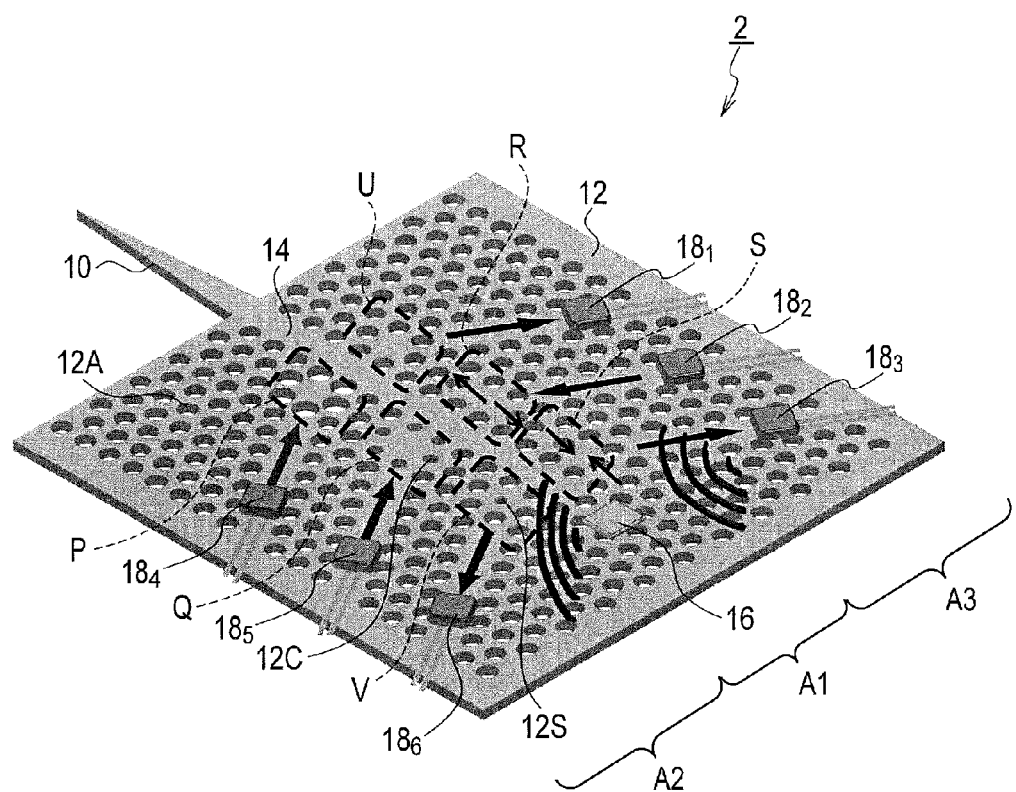
FIG. 26 is an explanatory diagram showing an arrangement configuration of a multi/demultiplexer on the THz-wave IC to which the THz-wave connector according to the first embodiment is applied.

FIG. 25 shows a schematic bird's-eye view configuration of a THz-wave IC 2 providing at least one side of input and output interfaces of the 2D-PC slab 12 with the THz-wave connector 1 according to the first embodiment. Moreover, FIG. 26 shows a configuration of a multi/demultiplexer on the THz-wave IC 2 to which the THz-wave connector 1 according to the embodiment is applied. As shown in FIGS. 25-26, the THz-wave IC 2 includes a first slab area A1, a second slab area A2, and a third slab area A3. The first slab area A1 includes multi/demultiplexer formation regions P, Q, R, S, U, V enclosed with dashed lines as shown in FIG. 26, and includes a plurality of non-periodically arranged lattice points 12A. The second slab area A2 and the third slab area A3 include pluralities of periodically arranged lattice points 12A.

As shown in FIG. 25, the THz-wave IC 2 to which the THz-wave connector 1 according to the first embodiment is applied includes: a 2D-PC slab 12; lattice points 12A periodically arranged in the 2D-PC slab 12, the lattice points 12A for diffracting the THz waves in PBG frequencies of photonic band structure of the 2D-PC slab 12 in order to prohibit existence in a plane of the 2D-PC slab.

A 2D-PC waveguide 14 disposed in the 2D-PC slab 12 and formed with a line defect of the lattice points; and an adiabatic mode converter (protruding portion) 10 disposed at an edge face of the 2D-PC slab 12 to which the 2D-PC waveguide 14 extended, the 2D-PC waveguide 14 extended to the adiabatic mode converter 10.

The THz-wave IC 2 to which the THz-wave connector 1 according to the first embodiment is applied may include a plurality of transceivers $18_1$, $18_2$, $18_3$, $18_4$, $18_5$, $18_6$, an antenna 16, and a PC multi/demultiplexer 20, as shown in FIG. 25. In this case, a plurality of the transceivers $18_1$, $18_2$, $18_3$, $18_4$, $18_5$, $18_6$ can transmit and receive THz waves having a plurality of different frequencies $f_1$, $f_2$, $f_3$, $f_4$, $f_5$, $f_6$. In FIG. 25, each arrow displayed corresponding to the frequencies $f_1$, $f_2$, $f_3$, $f_4$, $f_5$, $f_6$ denotes transmission or reception directions.

As shown in FIG. 26, the multi/demultiplexers which can input/output specific frequencies can be formed by disturbing the periodic structure of the lattice points 12A arranged periodically in the 2D-PC slab 12. Such multi/demultiplexers are formed in multi/demultiplexer formation regions P, Q, R, S, U, V enclosed with dashed lines as shown in FIGS. 25 and 26. The frequency band of the multi/demultiplexer is adjustable with a method (number of pieces) of filling holes of the lattice points 12A, the hole size of the filled surroundings, the shift of the positions of holes, change of the size of surrounding period of holes, etc. For example, if the hole is made smaller, the number of pieces is increased, or the period is made longer, the frequency band applicable will be shifted to a low frequency side. On the other hand, if the hole is made larger, the number of pieces is decreased, or the period is made shorter, the frequency band applicable will be shifted to a high frequency side. More specifically, if the hole is made larger, it will be shifted to the higher-frequency side since the refractive index sensed in the THz waves becomes smaller, but, conversely, if the hole is made smaller, it will be shifted to the lower-frequency side since the refractive index sensed in the THz waves becomes larger.

For example, in the multi/demultiplexer formation region P enclosed with the dashed line, the surrounding hole size is set up larger. In the multi/demultiplexer formation region Q, the size of the surrounding hole 12C is set up smaller. A small hole 12S is introduced in the multi/demultiplexer formation region V. In the multi/demultiplexer formation region S, as shown with the arrow, two holes are shifted to inside. In the multi/demultiplexer formation region R, as shown with the arrow, two holes are shifted to outside. In the multi/demultiplexer formation region U, a central hole is filled, and thereby the number of pieces is decreased. The above-mentioned configuration of the multi/demultiplexer formation regions is merely one example.

[Second Embodiment]
(Waveguide Having Nonreflective Structure)

In the adiabatic mode converter (tapered structure) 10 of the THz-wave connector according to the first embodiment, the refractive index becomes lower adiabatically from the semiconductor having higher refractive index (e.g. approximately 3) to the medium having lower refractive index (e.g. approximately 1). Accordingly, it is possible to significantly reduce an influence of the edge face reflection. Such an adiabatic mode converter 10 is nonreflective structure which can be integrated/formed collectively in the PC waveguide. Accordingly, the THz-wave connector according to the first embodiment acts a role important in addition to the connection with the waveguide. More specifically, it is not only limited to the connector but also can be applied also as a waveguide of nonreflective structure, or a radiator of nonreflective structure. Moreover, handling frequency bands are not limited to the THz wave band, but a general light waves are also included. In this case, as the PC, the lattice constant a of the lattice points 12A is miniaturized, and thereby the operating wavelength may be set as ranging from approximately 1 μm to 2 μm bands, and the lattice constant is set as ranging from approximately 250 nm to approximately 500 nm, etc., for example. Moreover, the diameter and the depth of the lattice points 12A are respectively approximately 200 nm and approximately 300 nm, for example. The numerical examples can be appropriately changed according to materials, a wavelength, etc. to compose the 2D-PC slab 12. For example, in the 2D-PC slab 12 to which GaAs/GaAlAs based materials are applied, the wavelength is approximately 200 nm to approximately 400 nm.

The structure of the adiabatic mode converter 10 in the waveguide 3 according to the second embodiment is the same as that of the adiabatic mode converters 10, 10A, 10B, 10C in the THz-wave connector 1 according to the first embodiment.

The waveguide 3 according to the second embodiment includes: a 2D-PC slab 12; lattice points 12A periodically arranged in the 2D-PC slab 12, the lattice points 12A for diffracting the light waves or the THz waves in PBG frequencies of photonic band structure of the 2D-PC slab 12 in order to prohibit existence in a plane of the 2D-PC slab 12; a 2D-PC waveguide 14A disposed in the 2D-PC slab 12 and formed with a line defect of the lattice points 12A; and an adiabatic mode converter 10 disposed at an edge face of the 2D-PC slab 12 to which the 2D-PC waveguide 14A extended, the 2D-PC waveguide 14 extended to the adiabatic mode converter 10.

In this case, the waveguiding structure of nonreflective structure which can be integrated/formed collectively in the PC waveguide 14A is formed of the 2D-PC waveguide 14A disposed in the 2D-PC slab 12 and formed of the line defect of the lattice points 12A, and the adiabatic mode converter 10 disposed at an edge face of the 2D-PC slab 12 to which the 2D-PC waveguide 14A extended, the 2D-PC waveguide 14 extended to the adiabatic mode converter 10.

Moreover, in the waveguide 3 according to the second embodiment, in the same manner as FIG. 2, the adiabatic mode converter 10, in a planar view of the 2D-PC slab 12, may have a tapered shape so that a tip part becomes thinner as being distanced from the edge face of the 2D-PC slab 12. Moreover, the side surface of the tapered shape may have an inclined plane in the same manner as FIG. 2.

Moreover, the waveguide 3 according to the second embodiment may have protective structure for covering the adiabatic mode converter 10 with a resin layer 38 etc., in the same manner as FIG. 3.

Moreover, in the waveguide 3 according to the embodiment, the adiabatic mode converter 10A, in a planar view of the 2D-PC slab 12, may have a tapered shape so that a tip part becomes thinner as being distanced from the edge face of the 2D-PC slab 12, and the side surface of the tapered shape may have a curved surface, in the same manner as FIG. 5. In this case, the curved surface may have a hyperboloid surface or an exponential surface.

Moreover, in the waveguide 3 according to the second embodiment, the adiabatic mode converter 10B, in a planar view of the 2D-PC slab 12, may have a tapered shape so that a tip part becomes thinner as being distanced from the edge face of the 2D-PC slab 12, and the side surface of the tapered shape may have a plurality of stepped surfaces, in the same manner as FIG. 6.

Moreover, in the waveguide 3 according to the second embodiment, the adiabatic mode converter 10A, in a planar view of the 2D-PC slab 12, may have a tapered shape so that a tip part becomes thinner as being distanced from the edge face of the 2D-PC slab 12, and the side surface of the tapered shape may have a curved surface, in the same manner as FIG. 7A.

Moreover, in the waveguide 3 according to the second embodiment, the adiabatic mode converter 10C may have a conical shape so that the tip part becomes thinner as being distanced from the edge face of 2D-PC slab 12, in the same manner as FIG. 7B. In this case, the modified example of conical shape may include not only a trumpet-like shape, but also a simple conical shape in the same manner as FIG. 7B.

Moreover, in the waveguide 3 according to the second embodiment, the adiabatic mode converter 10C may have a quadrangular pyramid shape so that the tip part becomes thinner as being distanced from the edge face of 2D-PC slab 12, in the same manner as FIG. 8A.

Moreover, in the waveguide 3 according to the second embodiment, the adiabatic mode converter 10C may have a wedge-like shape so that the thickness of the tip part becomes thinner as being distanced from the edge face of 2D-PC slab 12, in the same manner as FIG. 8B.

Moreover, in the waveguide 3 according to the second embodiment, the adiabatic mode converter 10C may have a plurality of stairs-like shapes so that the thickness of the tip part becomes thinner as being distanced from the edge face of 2D-PC slab 12, in the same manner as FIG. 9A.

Moreover, in the waveguide 3 according to the second embodiment, the adiabatic mode converter 10C may have a plectrum-like shape so that the thickness of the tip part becomes thinner as being distanced from the edge face of 2D-PC slab 12, in the same manner as FIG. 9B. In this case, the adiabatic mode converter 10, in a planar view of the 2D-PC slab 12, may have a tapered shape so that a tip part becomes thinner as being distanced from the edge face of the 2D-PC slab 12, and the side surface of the tapered shape has a curved surface.

Figure 9C:
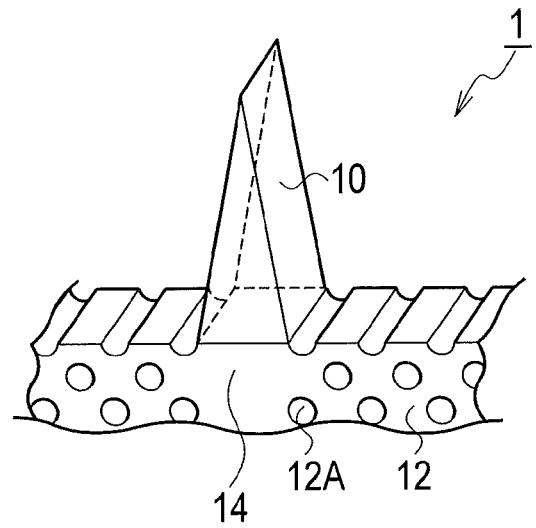
FIG. 9C is a schematic plane configuration diagram showing a THz-wave connector according to a modified example 9 of the first embodiment.

Moreover, in the waveguide 3 according to the second embodiment, the adiabatic mode converter 10C may have a wedge-like shape so that the width of the tip part becomes thinner as being distanced from the edge face of 2D-PC slab 12, in the same manner as FIG. 9C. In this case, the adiabatic mode converter 10, in a planar view of the 2D-PC slab 12, may have a tapered shape so that a tip part becomes thinner as being distanced from the edge face of the 2D-PC slab 12, and the side surface of the tapered shape has a inclined plane.

Moreover, in the waveguide 3 according to the second embodiment, the recess structure having the length $W_2$ in the edge face direction and the depth (gap distance) $W_1$ may be formed in the edge face of the 2D-PC slab 12 in the base portion, in the adiabatic mode converter 10 as same as that of FIG. 19. More specifically, in the edge face of the 2D-PC slab 12 where the adiabatic mode converter 10 is disposed, an excessive surface wave in the crystal edge face can be controlled in a peripheral part of the base in the adiabatic mode converter 10. In particular, it is preferable to be set as the gap distance $W_1$>the wavelength/3.

Moreover, in the waveguide 3 according to the second embodiment, the structure of the adiabatic mode converter 10 is not limited to the above-mentioned structures, but can also use a structure with which any one or more of such structures are combined with each other. For example, a plurality of step shapes may be introduced into the side surface of the quadrangular pyramid shape. Alternatively, the plurality of the step shape may be introduced into the side surface of the conical shape or conical trumpet-like shape.

Moreover, in the waveguide 3 according to the second embodiment, the lattice point for forming resonant-state may be arranged in any one selected from the group consisting of a square lattice, a rectangular lattice, a face-centered rectangle lattice, and a triangular lattice.

Moreover, the lattice points 12A may be provided with any one of the polygonal shape, circular shape, oval shape, or ellipse shape.

Moreover, in the waveguide 3 according to the second embodiment, the 2D-PC slab 12 may be formed of a semiconducting material. More specifically, anyone of Si, GaAs, InP, GaN, etc. are applicable to the semiconducting material, and any one of GaInAsP/InP based, GaInAs/GaAs based, GaAlAs/GaAs based or GaInNAs/GaAs based, GaAlInAs/InP based, GaAlInP/GaAs based, GaInN/GaN based materials, etc. are applicable to the semiconducting material. Moreover, the 2D-PC slab 12 may be formed with silicon having the resistivity equal to or greater than 3000 ωcm.

(Antenna Structure)

Since the waveguide 3 according to the second embodiment has a nonreflective effect in general optical devices using the waveguide 3, the waveguide 3 according to the second embodiment is applicable also to antenna structure 140, for example.

Figure 27:
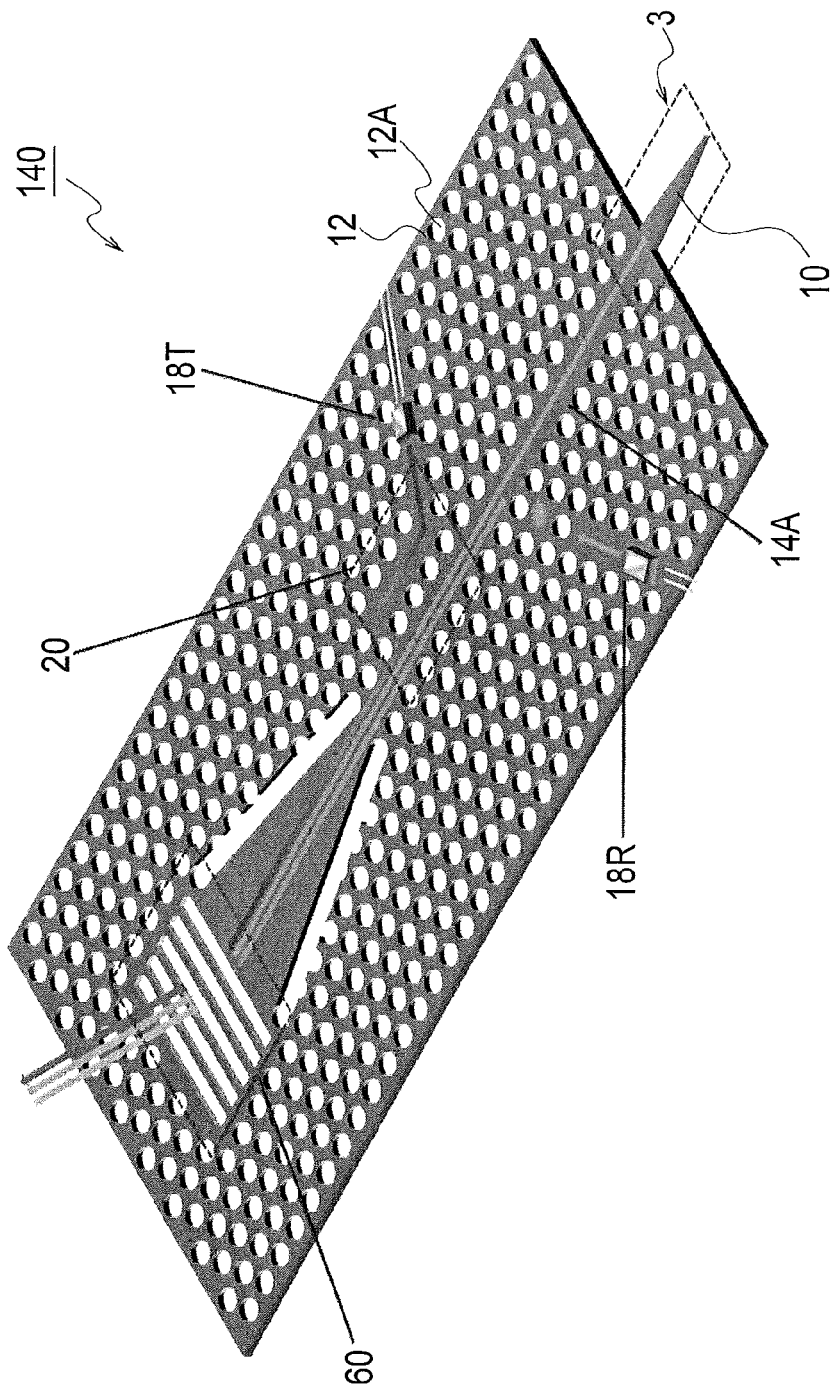
FIG. 27 is a schematic bird's-eye view configuration diagram showing antenna structure to which the waveguide according to a second embodiment is applied.

FIG. 27 shows a schematic bird's-eye view configuration of antenna structure 140 to which the waveguide 3 according to the second embodiment is applied.

As shown in FIG. 27, the antenna structure 140 to which the waveguide 3 according to the second embodiment includes: a 2D-PC slab 12; lattice points 12A periodically arranged in the 2D-PC slab 12, the lattice points 12A for diffracting the light waves or the THz waves in PBG frequencies of photonic band structure of the 2D-PC slab 12 in order to prohibit existence in a plane of the 2D-PC slab; a 2D-PC waveguide 14A disposed in the 2D-PC slab 12 and formed with a line defect of the lattice points; and an adiabatic mode converter 10 disposed at an edge face of the 2D-PC slab 12 to which the 2D-PC waveguide 14A extended, the 2D-PC waveguide 14A extended to the adiabatic mode converter 10.

As shown in FIG. 27, the antenna structure 140 to which the waveguide 3 according to the second embodiment is applied includes: an input/output interface 60; a PC multi/demultiplexer 20; a transmitter 18T; a receiver 18R; a 2D-PC waveguide 14A; and a waveguide 3 having nonreflective structure used as termination structure of the 2D-PC waveguide 14A. The input/output interface 60 is a coupler from free space, and is composed of a grating coupler consisting of a one-dimensional PC.

(Simulation Result of Reflectance)

Figure 28A:
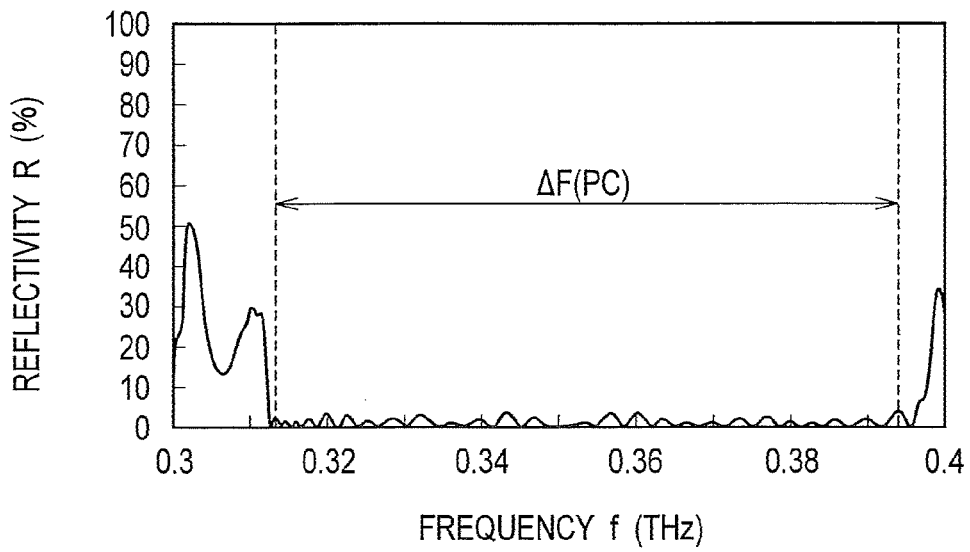
FIG. 28A shows a simulation result showing a relationship between a reflectance R and a frequency f in the PC waveguide to which the waveguide according to the second embodiment is applied.
Figure 28B:
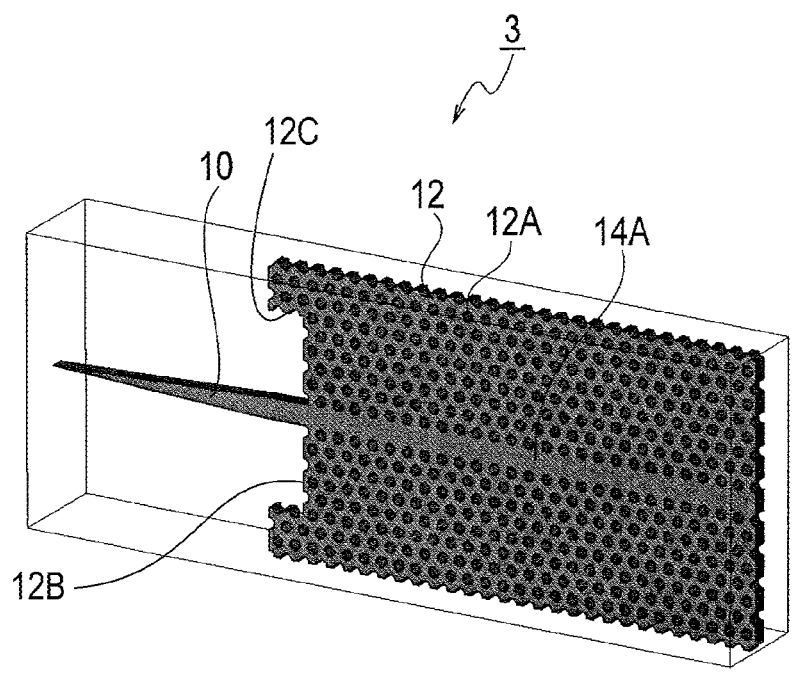
FIG. 28B is a schematic bird's-eye view configuration diagram showing the waveguide according to the second embodiment and the PC waveguide to which the waveguide is applied.

FIG. 28A shows a simulation result showing a relationship between the reflectance R and the frequency f in the PC waveguide 14A to which the waveguide 3 according to the second embodiment is applied. FIG. 28B shows a schematic bird's-eye view configuration of the waveguide 3 according to the second embodiment, and the PC waveguide 14A to which such a waveguide 3 is applied. In this case, the waveguide 3 shown in FIG. 28B includes a recess structure (a recessed portion 12C having a bottom surface 12B) in the edge face of the 2D-PC slab 12 of the base portion in the adiabatic mode converter 10, in the same manner as FIG. 19.

Figure 29A:
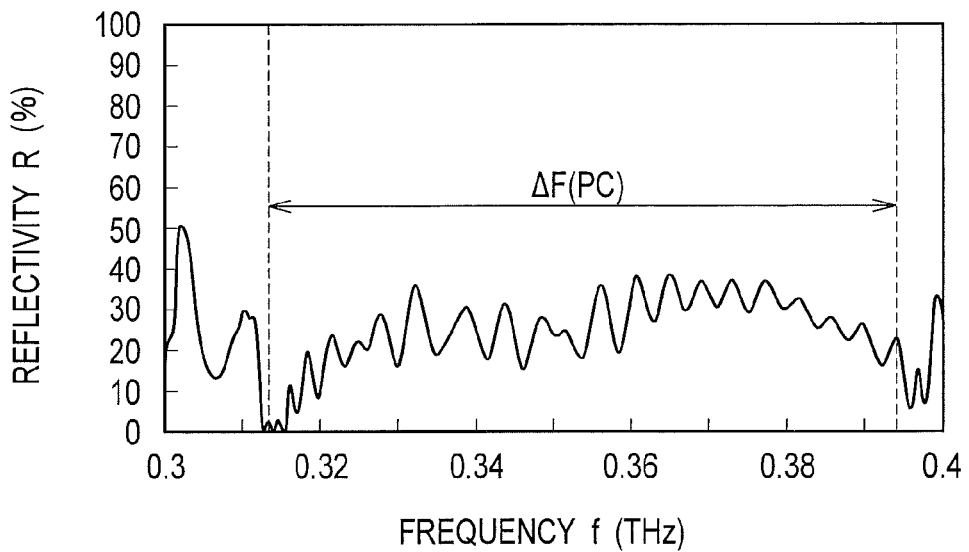
FIG. 29A shows a simulation result showing a relationship between a reflectance R and a frequency f in the PC waveguide in the case of not applying the waveguide of nonreflective structure, as a comparative example.
Figure 29B:
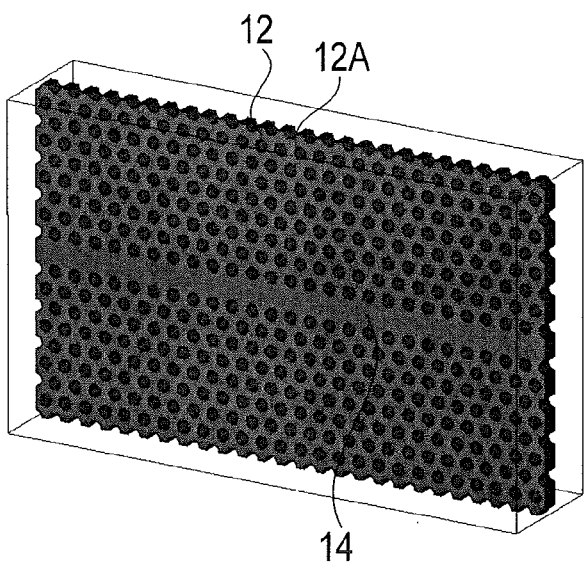
FIG. 29B is a schematic bird's-eye view configuration diagram showing the PC waveguide in the case of not applying the waveguide of nonreflective structure, as a comparative example.

Moreover, FIG. 29A shows a simulation result showing a relationship between a reflectance R and a frequency f in the PC waveguide in the case of not applying the waveguide of nonreflective structure, as a comparative example. FIG. 29B shows a schematic bird's-eye view configuration of the PC waveguide 14 in the case of not applying the waveguide having the nonreflective structure, as the comparative example.

The PC waveguide region is expressed with ΔF (PC) in FIGS. 28A and 29A.

In the PC waveguide 14A to which the waveguide 3 according to the second embodiment is applied, as shown in FIG.

28A, the average reflectance R in ΔF (PC) (0.313 THz to 0.395 THz) is approximately 1.1%. On the other hand, the average reflectance R in ΔF (PC) of the PC waveguide 14 according to the comparative example is higher as approximately 26%. In addition, the result shown in FIG. 29A is a result in the one-sided edge face of the PC waveguide 14. Accordingly, the actual value becomes larger than the value shown in FIG. 29A.

In the PC waveguide 14A to which the waveguide 3 according to the second embodiment is applied, the average reflectance R in ΔF (PC) is reduced to approximately 1/23 as compared with the case where the waveguide having the nonreflective structure is not applied (no tapered structure). In the PC waveguide 14A to which the waveguide 3 according to the embodiment is applied, the configuration shown in FIG. 28B may include an antireflection film formed of a dielectric multilayer etc., in the edge face of the opposite side which does not form the adiabatic mode converter 10.

In the adiabatic mode converter 10 having the tapered structure of the waveguide 3 according to the second embodiment, the refractive index becomes lower adiabatically in the guiding direction from the semiconductor having higher refractive index (e.g. approximately 3) to the medium having lower refractive index (e.g. approximately 1). Therefore, the waveguide 3 acts also as a radiator (a kind of radiation antenna) for radiating the light waves or THz waves to free space from the waveguide confined in the PC. Moreover, the waveguide 3 can operate also as an input mechanism for inputting the light waves or THz waves into the waveguide from the free space in the same manner as a general antennas.

(Result of Transmission Experiment of Waveguide Having Taper)

Figure 30:
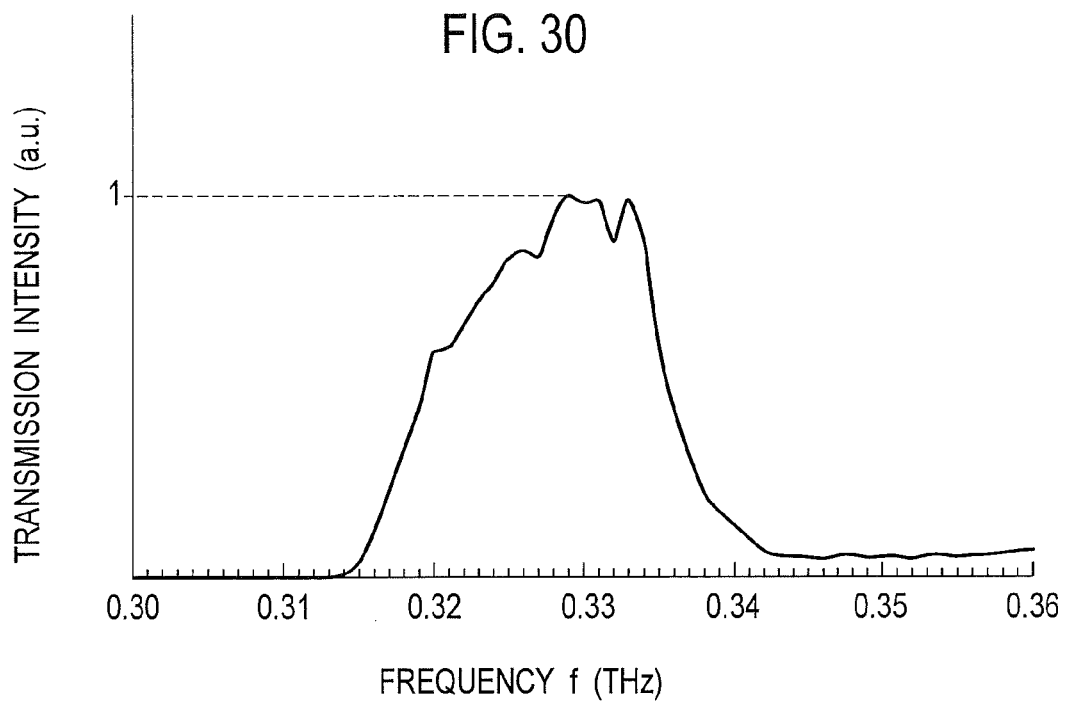
FIG. 30 shows an experimental result showing a relationship between transmission intensity and a frequency f in the PC waveguide to which the waveguide according to the second embodiment is applied (an example of a transmission spectrum).

FIG. 30 shows an experimental result showing a relationship between transmission intensity (a. u.) and a frequency f in the PC waveguide 14A to which the waveguide 3 according to the second embodiment is applied (an example of a transmission spectrum).

In the PC waveguide 14A to which the waveguide 3 according to the second embodiment is applied, since the tip part of the PC waveguide 14A includes the adiabatic mode converter 10 having the tapered structure, disorder of the spectrum under the effect of interference of the edge face is significantly reduced, as shown in FIG. 30.

(Simulation Result of Electromagnetic Field Radiation Pattern)

Figure 31:
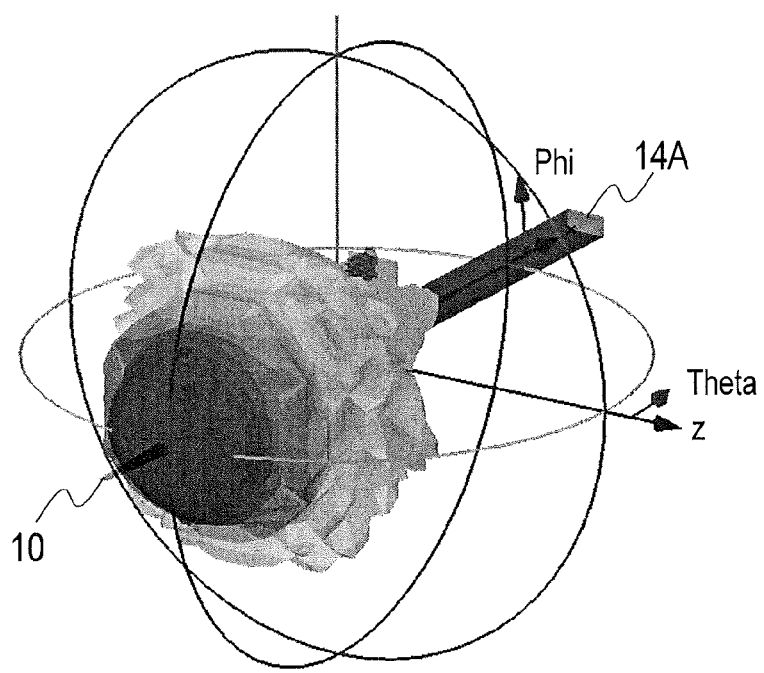
FIG. 31 shows a simulation result of a three-dimensional electromagnetic field radiation pattern in the PC waveguide to which the waveguide according to the second embodiment is applied.
Figure 32:
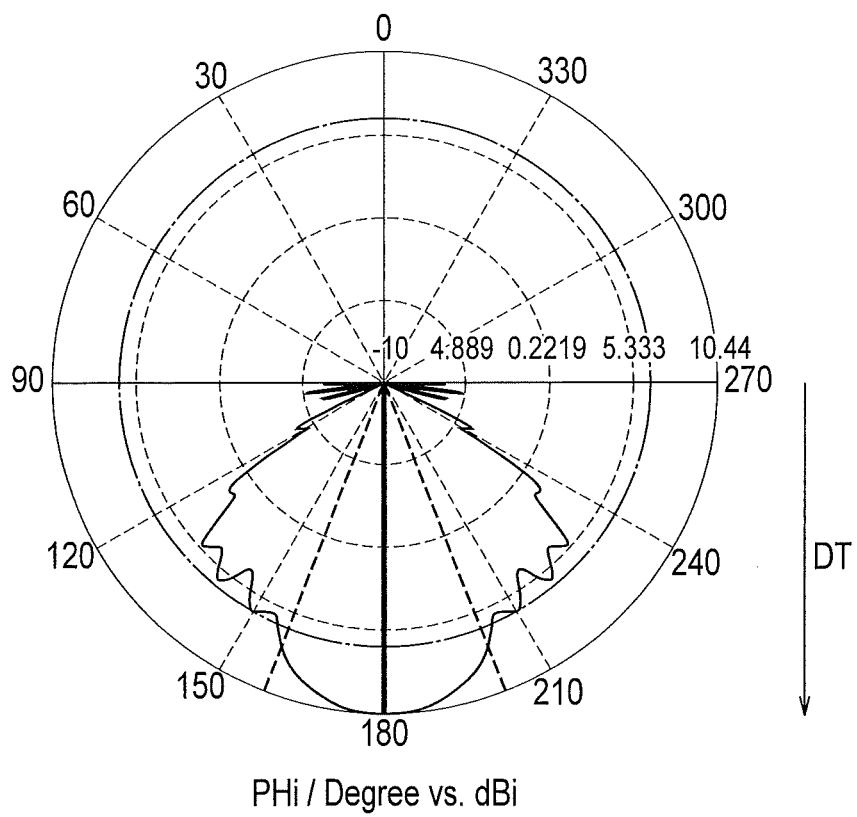
FIG. 32 shows a simulation result of a cross-sectional radiation pattern in which directivity is indicating in a taper tip direction DT, in the PC waveguide to which the waveguide according to the second embodiment is applied.

FIG. 31 shows a simulation result of three-dimensional electromagnetic field radiation pattern in the PC waveguide 14A to which the waveguide 3 according to the second embodiment is applied. FIG. 32 shows a simulation result of a cross-sectional radiation pattern in which directivity is indicating in a taper tip direction DT In the waveguide 3 according to the second embodiment, the light waves or the THz waves are radiated directionally from the PC waveguide 14A in the taper tip direction. The antenna gain in this case is approximately 10.44 (dBi), for example. In the present embodiment, the dBi is a value which indicates the directive intensity with respect to homogeneous radiation with the dB unit. That is, the increase value of the dB intensity compared with the homogeneous radiation is indicated as a unit. In FIG. 31, the directivity in a range in which the electric power is increased by 3 dB compared with the homogeneous radiation is approximately 40 degrees at one side.

The waveguide 3 according to the second embodiment acts as an antenna in a wide-band operation without the frequency dependence of the radiation direction, reflecting the lowness of the reflectance R.

(Structure Example of Arrayed Taper)

Figure 33B:
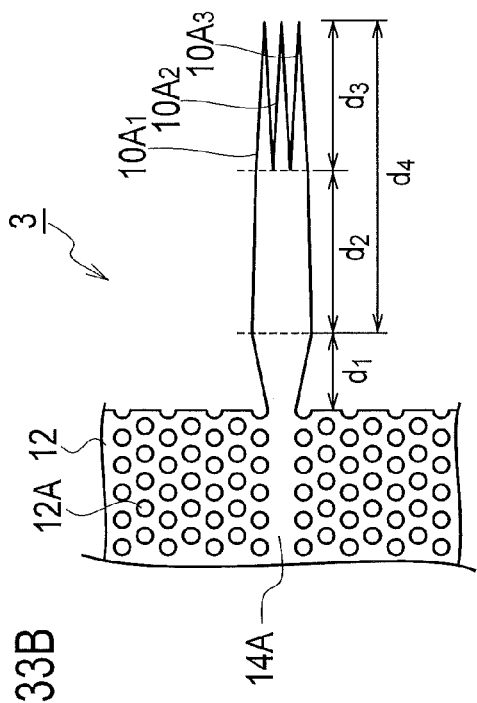
FIG. 33B shows a structure example in which an adiabatic mode converter (tapered part) of the waveguide according to the second embodiment is arrayed, and shows in particular an example of three array antenna.
Figure 33D:
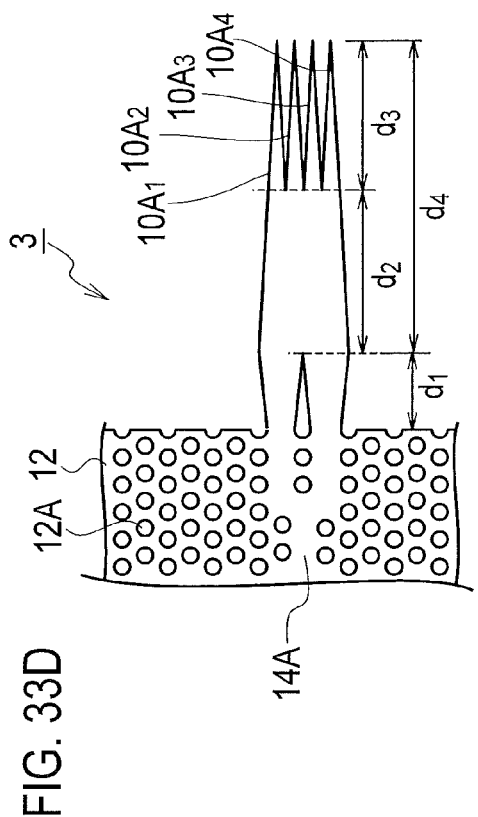
FIG. 33D shows a structure example in which an adiabatic mode converter (tapered part) of the waveguide according to the second embodiment is arrayed, and shows in particular another example of four array antenna.
Figure 33A:
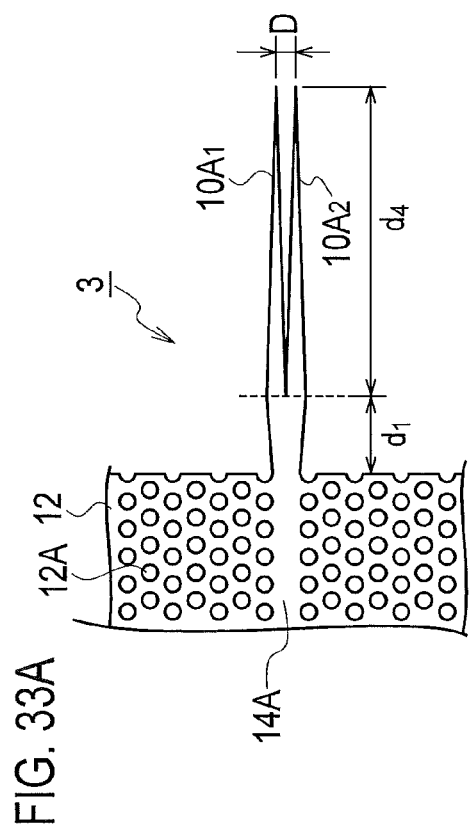
FIG. 33A shows a structure example in which an adiabatic mode converter (tapered part) of the waveguide according to the second embodiment is arrayed, and shows in particular an example of two array antenna.
Figure 33C:
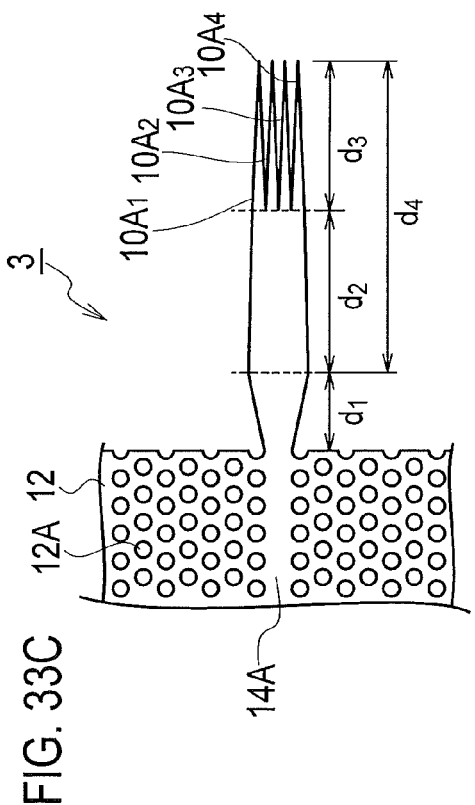
FIG. 33C shows a structure example in which an adiabatic mode converter (tapered part) of the waveguide according to the second embodiment is arrayed, and shows in particular an example of four array antenna.

In a structure example in which the adiabatic mode converter (tapered part) of the waveguide according to the second embodiment is arrayed, FIG. 33A shows a two array antenna, FIG. 33B shows an example of three array antenna, FIG. 33C shows an example of four array antenna, and FIG. 33D shows another example of the four array antenna.

More specifically, as shown in FIG. 33A, the two array antenna includes two tapered parts $10A_1$, $10A_2$. As shown in FIG. 33B, three array antenna includes three tapered parts $10A_1$, $10A_2$, $10A_3$. As shown in FIG. 33C, the four array antenna includes four tapered parts $10A_1$, $10A_2$, $10A_3$, $10A_4$. As shown in FIG. 33D, another example of the four array antenna also includes four tapered parts $10A_1$, $10A_2$, $10A_3$, $10A_4$.

Figure 34A:
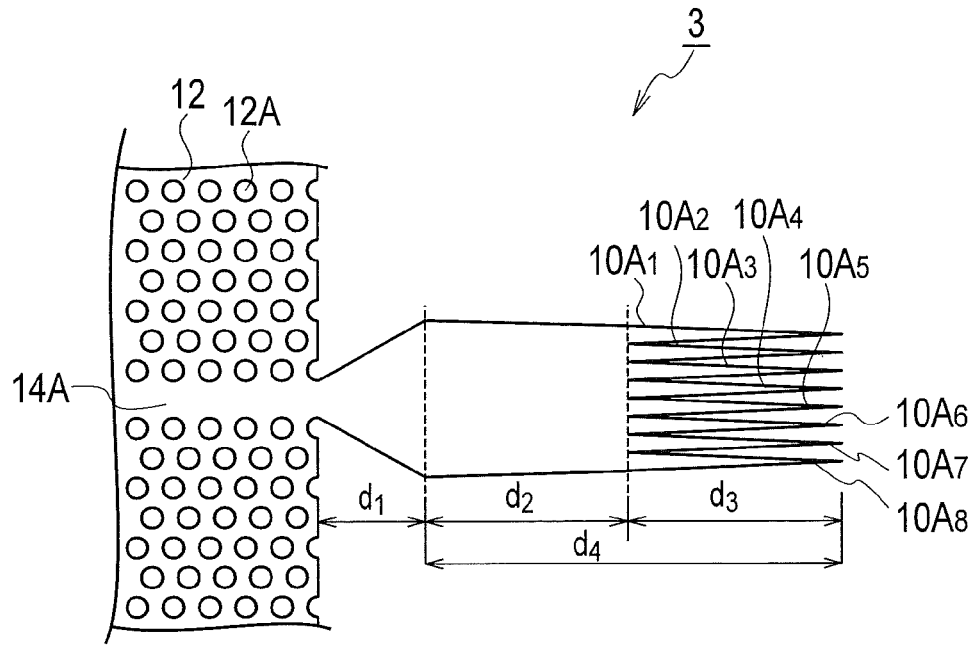
FIG. 34A shows a structure example in which a tapered part of the waveguide according to the second embodiment is arrayed, and shows in particular an example of eight array antenna.
Figure 34B:
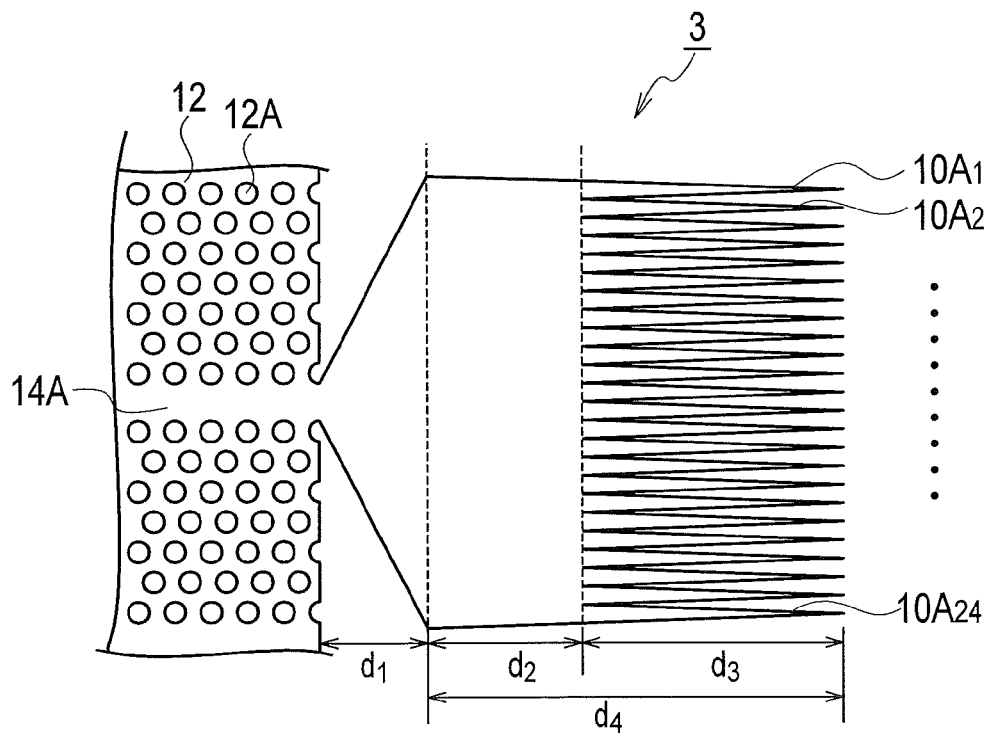
FIG. 34B shows a structure example in which a tapered part of the waveguide according to the second embodiment is arrayed, and shows in particular an example of 24 array antenna.

Furthermore, in a structure example arraying tapered parts in the waveguide 3 according to the second embodiment, FIG. 34A shows an example of eight array antenna, and FIG. 34B shows an example of 24 array antenna. As shown in FIG. 34A, the eight array antenna includes eight tapered parts $10A_1$, $10A_2$, $10A_3$, $10A_4$, ..., $10A_8$. Furthermore, as shown in FIG. 34B, the 24 array antenna includes 34 tapered parts $10A_1$, $10A_2$, $10A_3$, $10A_4$, ..., $10A_{24}$.

Figure 35:
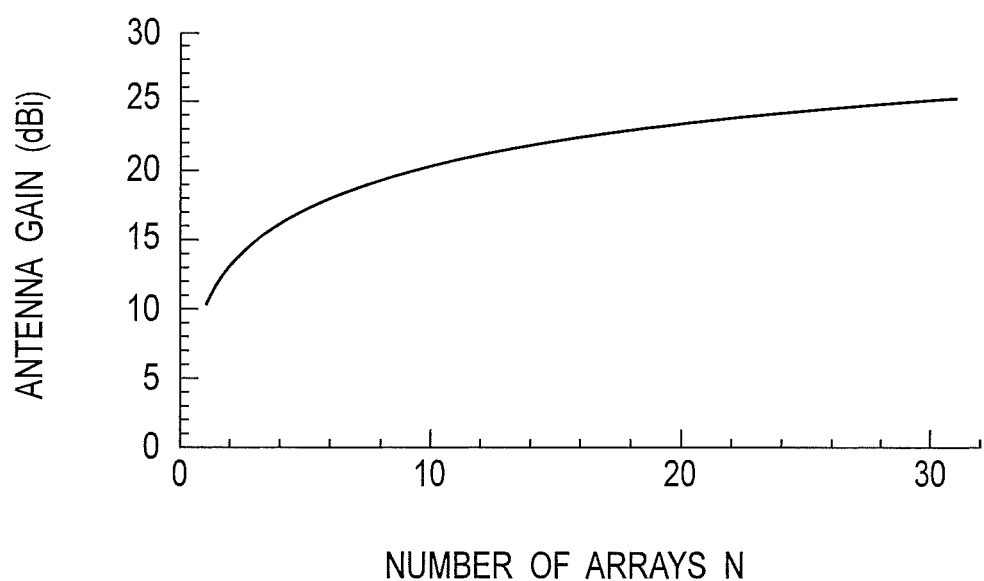
FIG. 35 shows a simulation result of a relationship between an antenna gain (dBi) and the number N of arrays, in the structure in which the tapered part of the waveguide according to the second embodiment is arrayed.

FIG. 35 shows a simulation result of a relationship between the antenna gain (dBi) and the number N of the arrays in structure arraying the adiabatic mode converters 10, in the waveguide 3 according to the second embodiment. The adiabatic mode converters 10 are arrayed, thereby increasing the aperture area, and improving the radiation directivity, i.e., antenna gain. The maximum intensity is increased in proportion to the number N of the arrays. In this case, the distance D between the arrays may be set as $0<D<\lambda$. Still more preferable, the distance D may be set as $\lambda/8<D<(3/8)\lambda$, and the optimum value is a range of D to $\lambda/4$. In this Case, the $\lambda$ is a wavelength of the light waves or the THz waves radiated or received in the waveguide 3 according to the embodiment.

In FIGS. 33 and 34, a relationship between the sizes $d_1$, $d_2$, $d_3$, $d_4$ of each part of the taper preferable satisfies $d_1 > \lambda$ and $d_4 = d_2 + d_3 > \lambda$.

In the waveguide 3 according to the second embodiment, the near field array antenna can be composed by arraying the adiabatic mode converters 10 (tapered parts).

As explained above, according to the present invention, there can be provided the THz-wave connector which can reduce the connection loss in the interface between the 2D-PC slab and the waveguide, and the THz-wave IC to which such a THz-wave connector is applied.

Moreover, according to the present invention, there can be provided the waveguide having nonreflective structure for controlling the influence of light interference (Fabry-Perot resonance) and multiple reflections in the waveguide end, and the antenna structure to which such a waveguide is applied.

[Other Embodiments]

The present invention has been described by the embodiments, as a disclosure including associated description and drawings to be construed as illustrative, not restrictive. This disclosure makes clear a variety of alternative embodiments, working examples, and operational techniques for those skilled in the art.

Such being the case, the present invention covers a variety of embodiments, whether described or not. Therefore, the technical scope of the present invention is determined from the invention specifying items related to the claims reasonable from the above description.

What is claimed is:

1. A terahertz-wave connector, comprising:
   a two dimensional photonic crystal slab;
   lattice points periodically arranged in the slab, the lattice points for diffracting terahertz waves in photonic bandgap frequencies of photonic band structure of the slab in order to prohibit existence of the terahertz waves in a plane of the slab;
   a two dimensional photonic crystal waveguide disposed in the slab and formed with a line defect of the lattice points; and
   an adiabatic mode converter disposed at an edge face of the slab to which the waveguide extended, the waveguide extended to the adiabatic mode converter, wherein
   the adiabatic mode converter, in a planar view of the slab, may have a tapered shape so that a tip part becomes thinner as being distanced from the edge face of the slab, and a side surface of the tapered shape has an inclined plane.

2. A terahertz-wave connector comprising:
   a two dimensional photonic crystal slab;
   lattice points periodically arranged in the slab, the lattice points for diffracting terahertz waves in photonic bandgap frequencies of photonic band structure of the slab in order to prohibit existence of the terahertz waves in a plane of the slab;
   a two dimensional photonic crystal waveguide disposed in the slab and formed with a line defect of the lattice points; and
   an adiabatic mode converter disposed at an edge face of the slab to which the waveguide extends,
   wherein the adiabatic mode converter has a stairs-like shape so that a thickness of the tip part becomes thinner as being distanced from the edge face of the slab.

3. The terahertz-wave connector according to claim 1, wherein the adiabatic mode converter is protected with a resin layer.

4. The terahertz-wave connector according to claim 1, wherein the adiabatic mode converter can be inserted into a waveguide line.

5. The terahertz-wave connector according to claim 1, wherein a waveguide flange disposed in the edge face of the two dimensional photonic crystal slab contacts with the edge face.

6. The terahertz-wave connector according to claim 1, wherein a waveguide flange disposed in the edge face of the two dimensional photonic crystal slab is distanced from the edge face.

7. The terahertz-wave connector according to claim 1, wherein, in a peripheral part of the adiabatic mode converter, a gap is formed between the edge face of the two dimensional photonic crystal slab where the adiabatic mode converter is disposed, and a waveguide flange disposed in the edge face of the two dimensional photonic crystal slab, and thereby the edge face of the two dimensional photonic crystal slab is distanced from the waveguide flange.

8. The terahertz-wave connector according to claim 1, wherein the two dimensional photonic crystal slab is formed of a semiconducting material.

9. A terahertz-wave integrated circuits comprising the terahertz-wave connector according to claim 1, wherein the terahertz-wave connector is disposed in at least one side of input and output interfaces of the two dimensional photonic crystal slab.

10. The terahertz-wave integrated circuits according to claim 9, wherein any one a transceiver, an antenna or a two dimensional photonic crystal multi/demultiplexer is mounted on the two dimensional photonic crystal slab.

11. A two dimensional photonic crystal slab having an edge face, comprising:
    lattice points periodically arranged in the two dimensional photonic crystal slab, the lattice points for diffracting light waves or terahertz waves in photonic bandgap frequencies of photonic band structure of the two dimensional photonic crystal slab in order to prohibit existence of the terahertz waves in a plane of the two dimensional photonic crystal slab;
    a two dimensional photonic crystal waveguide disposed in the two dimensional photonic crystal slab, extending to and formed with a line defect of the lattice points; and
    an adiabatic mode converter disposed at the edge face of the two dimensional photonic crystal slab to which the two dimensional photonic crystal waveguide extends, the two dimensional photonic crystal waveguide extended to the adiabatic mode converter wherein
    the adiabatic mode converter, in a planar view of the slab, may have a tapered shape so that a tip part becomes thinner as being distanced from the edge face of the slab, and a side surface of the tapered shape has an inclined plane.

12. The two dimensional photonic crystal slab according to claim 11, wherein the adiabatic mode converter is arrayed.

13. The two dimensional photonic crystal slab according to claim 12, wherein a distance D between the arrays is $0<D<\lambda$ with respect to a wavelength in the medium $\lambda$ of the light waves or the THz waves.

14. The two dimensional photonic crystal slab according to claim 13, wherein the distance D between the arrays is $\lambda/8<D<(3/8)\lambda$.

15. The two dimensional photonic crystal slab according to claim 14, wherein the distance D between the arrays is $\lambda/4$.

16. A two dimensional photonic crystal slab, comprising:
    lattice points periodically arranged in the two dimensional photonic crystal slab, the lattice points for diffracting light waves or terahertz waves in photonic bandgap frequencies of photonic band structure of the two dimensional photonic crystal slab in order to prohibit existence of the terahertz waves in a plane of the two dimensional photonic crystal slab;
    a two dimensional photonic crystal waveguide disposed in the two dimensional photonic crystal slab and formed with a line defect of the lattice points; and
    an adiabatic mode converter disposed at an edge face of the two dimensional photonic crystal slab to which the two dimensional photonic crystal waveguide extended, the two dimensional photonic crystal waveguide extended to the adiabatic mode converter wherein
    the adiabatic mode converter has a stairs-like shape so that a thickness of the tip part becomes thinner as being distanced from the edge face of the slab.

17. The two dimensional photonic crystal slab according to claim 16, wherein any one of a transmitter, a receiver, a two dimensional photonic crystal multi/demultiplexer, or input/output interface are mounted on the two dimensional photonic crystal slab.

18. The terahertz-wave connector according to claim 2, wherein the adiabatic mode converter is protected with a resin layer.

19. The terahertz-wave connector according to claim 2, wherein the adiabatic mode converter can be inserted into a waveguide line.

20. The terahertz-wave connector according to claim 2, wherein a waveguide flange disposed in the edge face of the slab contacts with the edge face.

21. The terahertz-wave connector according to claim 2, wherein a waveguide flange disposed in the edge face of the slab is distanced from the edge face.

22. The terahertz-wave connector according to claim 2, wherein, in a peripheral part of the adiabatic mode converter, a gap is formed between the edge face of the slab where the adiabatic mode converter is disposed, and a waveguide flange disposed in the edge face of the slab, and thereby the edge face of the slab is distanced from the waveguide flange.

23. The terahertz-wave connector according to claim 2, wherein the slab is formed of a semiconducting material.

24. A terahertz-wave integrated circuit comprising the terahertz-wave connector according to claim 1, wherein the terahertz-wave connector is disposed in at least one side of the input and output interfaces of the slab.

25. The terahertz-wave integrated circuits according to claim 9, wherein any one a transceiver, an antenna or a multi/demultiplexer is mounted on the slab.

26. A two dimensional photonic crystal slab having a first slab area, a second and third slab areas disposed on opposite sides of the first slab area, and an edge face bounding the first, second and third slab areas on one lateral side of the slab, the slab comprising:
a plurality of lattice points non-periodically arranged in the first slab area, and periodically arranged in the second and third slab areas, the plurality of lattice points for diffracting light waves or terahertz waves in photonic bandgap frequencies of photonic band structure of the slab in order to prohibit existence of the terahertz waves in a plane of the slab;
a two dimensional photonic crystal waveguide disposed in the first slab area and having a propagation direction toward the edge face; and
a protruding portion disposed at the edge face of the slab, the protruding portion extending from the first slab area in the propagation direction, the protruding portion having a tapered shape so that a tip part becomes thinner as a distance from the edge face of the slab increases in a planar view of the slab.

27. A two dimensional photonic crystal slab having an edge face, comprising:
a plurality of lattice points periodically arranged in the slab, the plurality of lattice points for diffracting light waves or terahertz waves in photonic bandgap frequencies of photonic band structure of the slab in order to prohibit existence of the terahertz waves in a plane of the slab;
a two dimensional photonic crystal waveguide disposed in the slab, extending in a propagation direction of the waveguide to the edge face, and formed with a line defect of the plurality of lattice points; and
a protruding portion disposed at the edge face so as to extend from the waveguide in the propagation direction; and
a recess in the edge face having a bottom surface contacting a peripheral part of the protruding portion.

* * * * *